United States Patent [19]

Allen, Jr.

[11] 3,825,905

[45] July 23, 1974

[54] BINARY SYNCHRONOUS COMMUNICATIONS PROCESSOR SYSTEM AND METHOD

[75] Inventor: Chester C. Allen, Jr., Richardson, Tex.

[73] Assignee: Action Communication Systems, Inc., Dallas, Tex.

[22] Filed: Sept. 13, 1972

[21] Appl. No.: 288,734

[52] U.S. Cl. .......... 340/172.5

[51] Int. Cl. .......... G06f 3/00, G06f 11/08

[58] Field of Search .......... 340/172.5; 178/50; 179/2 DP, 84 VP, 84 VR

[56] References Cited

UNITED STATES PATENTS

| | | | |
|---|---|---|---|
| 3,310,626 | 3/1967 | Cassidy, Jr. | 178/50 |
| 3,452,330 | 6/1969 | Avery | 340/172.5 |
| 3,482,213 | 12/1969 | Bennett et al. | 340/172.5 |
| 3,525,077 | 8/1970 | Jablonski | 340/172.5 |
| 3,560,924 | 2/1971 | McBride | 340/172.5 |
| 3,647,973 | 3/1972 | James et al. | 340/172.5 |
| 3,676,846 | 7/1972 | Busch | 340/172.5 X |
| 3,678,469 | 7/1972 | Freeman et al. | 340/172.5 |
| 3,702,988 | 11/1972 | Haney et al. | 340/172.5 |
| 3,710,327 | 1/1973 | Books et al. | 340/172.5 |

*Primary Examiner*—Harvey E. Springborn
*Attorney, Agent, or Firm*—Richards, Harris & Medlock

[57] ABSTRACT

The specification discloses a communications processor system including a message switching digital computer programmed to receive binary coded data from a plurality of communication control devices connected to communication lines. The binary coded data is stored in the computer and subsequently transmitted to designated ones of the communication control devices. At least one of the communication control devices comprises a binary synchronous system which includes circuitry for converting serial digital data received from a communication line into parallel digital data. The parallel digital data comprises line control characters, text data and cyclic redundancy checking (CRC) characters. A micro central processor unit receives the digital data and, in response to the line control characters, synchronizes and forms the text data into message blocks. After completion of a message block, a CRC error code signal is computed and compared with the CRC characters contained within the digital data. If the error check is satisfactory, the message block is transmitted to the computer for storage and for later transmittal to a designated communication control device. The digital data utilized with the invention is transmitted in the transparent text mode such that the line control characters may be selectively utilized for control functions or for text data.

11 Claims, 11 Drawing Figures

BINARY SYNCHRONOUS COMMUNICATIONS PROCESSOR SYSTEM AND METHOD

FIELD OF THE INVENTION

This invention relates to communications control, and particularly relates to a message switching system utilizing binary synchronous communication procedures for the control of the transmission and reception of teletype traffic over communication links.

THE PRIOR ART

An important use for digital computers has long been the control of the transmission and reception of messages and data over communications circuits. More recently, specialized communications processors have been developed in order to relieve general purpose computers from the heavy workload created by such communication control and also to provide more efficient handling of communication data. An example of a communications processor which controls the transmission and reception of teletype traffic is the TELECONTROLLER system manufactured and sold by the present assignee, Action Communications Systems Inc. of Dallas, Texas.

Briefly, such communications processor systems have generally comprised a properly programmed digital computer connected by a high speed data buss to a plurality of control devices each controlling a different communications line such as a telephone or teletype line. Data may be received, stored and transmitted from the computer in either asynchronous or synchronous modes. In particular, it has been found that the use of binary synchronous communications procedures is advantageous in providing efficient and accurate digital data transmission. However, in prior communications processor systems, the use of binary synchronous communication procedures has placed a substantial additional workload upon the central processor unit of the communications processor. In addition, the programming of the communications processor in order to accommodate binary synchronous communication procedures has heretofore been relatively complex and expensive. Moreover, the additional computer workload and programming difficulties have increased as additional binary synchronous control devices have been added, thus placing limits upon the growth flexibility of the communications processor system.

SUMMARY OF THE INVENTION

In accordance with the present invention, a communications processor system is provided which overcomes the foregoing and other disadvantages that have characterized the prior art of binary synchronous communications processing. The present invention utilizes relatively inexpensive micro central processor units and associated circuitry which may be interconnected with a digital message switching computer to provide efficient binary synchronous operation, without substantially increasing the workload of the computer and without the requirement of a substantial amount of complicated and expensive programming of the computer.

In accordance with the present invention, a communications processor system includes circuitry connected to a communication line for converting serial data on the line into parallel digital data. A central processor detects control characters in the parallel digital data and removes the control characters while synchronizing and forming the parallel digital data into message blocks. A digital message switching computer is connected to receive the message blocks from the processor and for controlling the distribution of the digital data to a designated station.

In accordance with another aspect of the invention, a digital computer is connected to a high speed data buss and is programmed to control the reception and distribution of digital messages over the data buss. A plurality of communication control devices are connected along the data buss for transmitting to and receiving digital messages from the computer. At least one of the communication control devices is a binary synchronous control device having circuitry for receiving digital data from a communications line and for synchronizing and forming the digital data into message blocks in response to control characters contained in the digital area. The circuitry removes the control characters from the digital data prior to transmitting the message blocks through the data buss to the computer.

In accordance with another aspect of the invention, a binary synchronous communications processor includes circuitry for converting binary coded tone signals received from a communications link into electrical binary coded signals having line control characters. A micro central processor unit is responsive to the line control characters for synchronizing the electrical binary coded signals and for removing the line control characters while forming the electrical binary coded signals into blocks of parallel text signals. An error checking circuit checks the accuracy of the text signals. A high speed data buss receives the error check signals and transmits the signals to a digital message switching computer which controls the distribution of the text signals to a designated communications station.

In accordance with yet another aspect of the invention, a communication processor system includes a message switching digital computer programmed to receive binary coded data from a plurality of communications stations connected to communication lines. The computer then transmits the binary coded data to designated ones of the communication stations. A converting circuit is coupled to one of the communication lines for converting serial digital data received from the communication line into parallel digital data and also for converting parallel digital data into serial digital data for transmission to the communication line. A micro central processor unit detects control characters in the parallel digital data output from the converter circuit and in response thereto synchronises and forms the parallel digital data into message blocks for transmission to the computer. The processor unit is further operable to receive parallel digital data from the computer and to add control characters thereto for transmission of the data through the converting circuitry to the communication line.

DESCRIPTION OF THE DRAWINGS

For a complete understanding of the present invention and for further objects and advantages thereof, reference is now made to the following description taken in conjunction with the accompanying drawings, in which.

DESCRIPTION OF THE PREFERRED EMBODIMENT

Figures 1, 4:
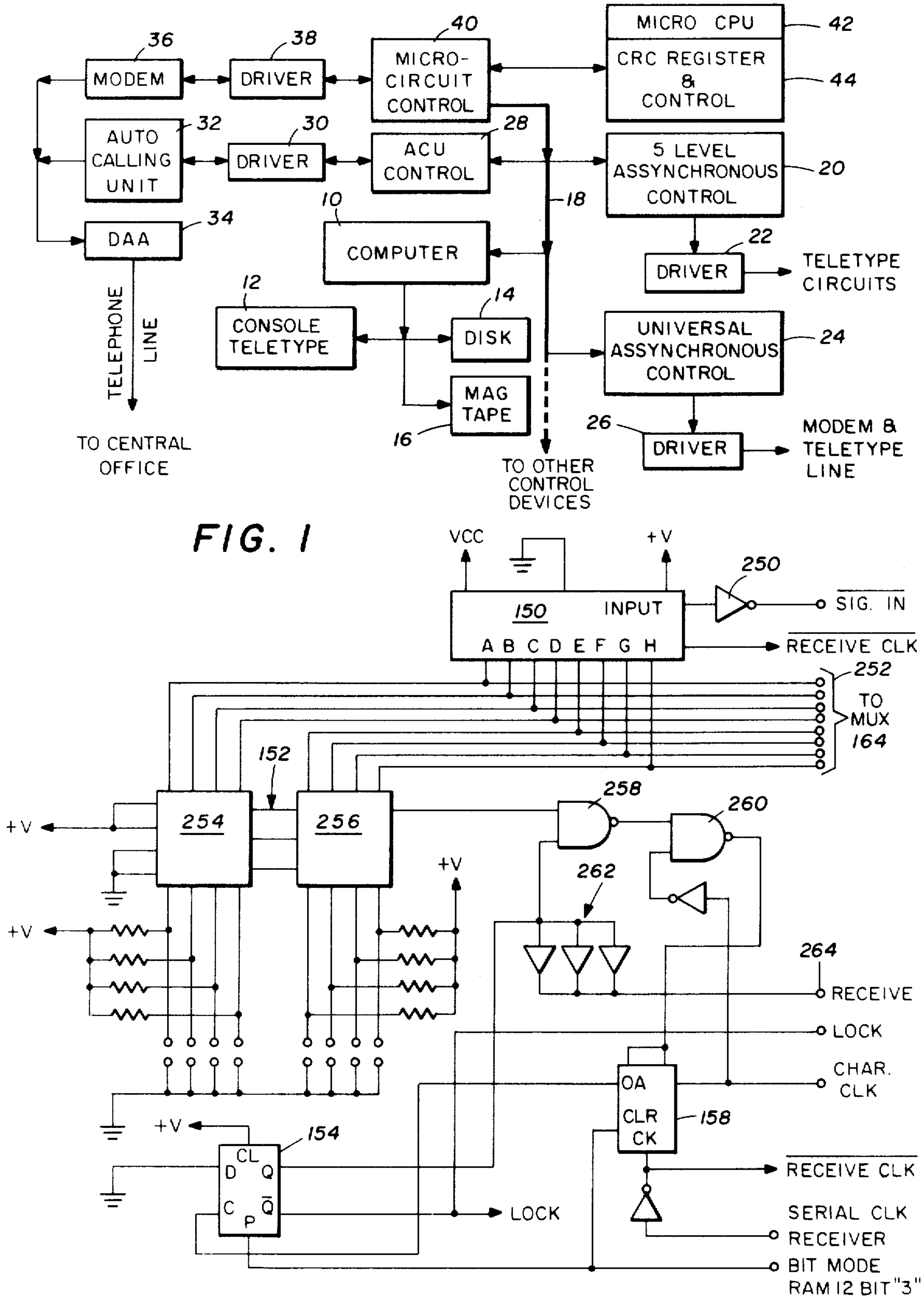
FIG. 1 is a block diagram of the communications control system of the invention.
FIG. 4 is an electrical block diagram of the synchronization portion of the circuit shown in FIG. 3.

FIG. 1 illustrates a block diagram of a typical communications processor system in accordance with the present invention. The system includes a computer 10 which may comprise any suitably programmed general purpose digital computer. An example of a suitable computer is the Nova Computer manufactured and sold by Data General Corporation of Southboro, Massachusetts. For a detailed description of the construction and operation of the Nova Computer, reference is made to the publication entitled "How to Use the Nova and the Supernova," published May 1970 by Data General Corporation.

A console teletype 12 is utilized as an input/output terminal for the computer 10. Program changes for the computer 10 may be input at the teletype 12, and diagnostic tests may be performed on the computer program by the teletype 12. Additionally, the teletype 12 may print out statistical information regarding the operation of the system shown in FIG. 1. Storage for the computer 10 is provided by a disc 14 and magnetic tape storage 16.

The computer 10 has a high speed data buss 18 in order to input and output data at high speeds in the micro second range. A plurality of communication control devices are connected along the data buss 18 and are controlled by the computer 10. For example, a five-level asynchronous control device 20 is connected to buss 18. The output of the control device 20 controls a driver 22 which is connected to conventional teletype circuits. Additionally, a universal asynchronous control device 24 may be connected to the buss 18. Control device 24 controls a driver 26 which is connected to a modem and a teletype line. An important aspect of the present invention is that the computer 10 may control the input and output of data among a plurality of different control devices having different operational speeds and signal characteristics. It will be understood that a relatively large number of control devices may be connected to the data buss 19 and that the control devices may comprise a wide variety of different devices.

For a more detailed description of the construction and operation of the five-level asynchronous control device 20 and the universal synchronous control device 24, reference is made to the manual entitled "Operation and Maintenance Instructions for the Telecontroller," published Apr. 1971 by Action Communication Systems, Inc., of Dallas, Texas.

The computer 10, in addition to its primary duty as a communications controller, insures that the communications traffic of the system is valid in format and that all major components of the system are functioning properly. The computer 10 operation is basically store and forward in design, in that it automatically invites individual automatic send and receive (ASR) terminals to transmit traffic. This is accomplished by the initiation of a transmitter start code (TSC) that is unique for each terminal on a communications circuit. If that ASR terminal has traffic to transmit, it is automatically transmitted to other terminals on that same circuit, to the computer 10 for storage and transmission to terminals on other circuits, or a combination of both.

Traffic is transmitted by computer 10 to the desired destination on the basis of call directing codes (CDC) contained in the address portion of the message. For "switch in" or "cross-office" traffic, the computer 10 transmits the CDC of a receiving terminal, receives a positive answer back which indicates that the ASR is clear to receive traffic, and then forwards the message.

After a particular ASR has been selected to send a message, the computer 10 monitors the transmitted message. If an invalid address or missing end of address code (EOAC) is detected, the computer will stop the message and notify the operator that he has attempted to send a message with an invalid format. If the and of message code (EOMC) is missing, the computer 10 will destroy the message and notify the originator of the missing EOMC. Thus, only complete messages will be transmitted only to valid addresses.

The computer 10 ensures maximum use of the circuits of the system by connecting all applicable CDC's on a circuit basis prior to sending the message. For example, consider a message address to three stations: AA, AB, and AC. The computer 10 will send AA and receive an answer back, will send AB and will receive an answer back and then send AC and not receive an answer back. The message is then set to AA and AB and will be retained in computer storage for later transmission to AC.

In case of loss of primary AC power, the computer 10 retains all messages stored in the system at the time of the power loss. In case the computer detects an open circuit in the circuit, the computer immediately breaks the circuit and sends FIGS/H/LTRS and then interrogates the circuit to see if it is still open. If the open circuit remains, an error signal is sent to the control ASR notifying the control supervisor of the station which is open. Periodically, the computer 10 will attempt to restore service to that circuit. When an attempt is successful, the computer will notify the control ASR. If the computer has been sending the message when the circuit malfunctions, the computer will resend the complete message after the circuit is restored. If the computer was receiving the message and the circuit malfunctioned, when the service is restored the computer will notify the originator of the message to resend it.

An important operation of the computer 10 is the generation of reports concerning message switching simultaneously with system operation. For example, reports will be provided through the teletype 12 regarding the number of messages waiting transmission on the circuit, the status of each circuit, the number of messages sent and received, characters sent and received and the like.

An automatic call unit (ACU) control device 28 is connected to the data buss 18 and controls a driver 30 for operation of an automatic calling unit (ACU) 32. For example, the automatic calling unit 32 may comprise the data auxiliary set 801A manufactured by the American Telephone & Telegraph Company. For a more detailed description of the automatic calling unit 32, reference is made to the Bell System data communications technical reference entitled "Data Auxiliary Set 801A (Automatic Calling Unit) Interface Specification," published Mar. 1964 by the American Telephone & Telegraph Company.

Basically, the automatic calling unit 32 is a DC dial pulse unit which permits a business machine to call any telephone number in a switched telephone network and to transfer the circuit to the associated modem for the automatic transmission of data. A telephone number which is stored in the business machine is transmitted to the ACU 32 in the form of parallel 4-bit binary signals. The ACU 32, under control of the business machine, will perform all the functions usually performed by an attendant in originating a data call. In operation, in response to an order from a business machine, the ACU 32 gives an "off-hook" indication to the telephone central office. After detecting the dial "go ahead" signal from the central office, the ACU 32 passes the telephone number digit-by-digit to the central office. Upon completion of the dialing, the ACU 32 waits for the call to be answered. When the called station answers, the ACU 32 detects the answer signal and transfers the telephone line to the modem so that the data transmission may be achieved in the usual fashion. After completion of data transmission, the business machine terminates the call.

The ACU 32 is connected through a data recess arrangement (DAA) 34 which is capable of connecting the ACU 32 and a modem 36 through the telephone lines to a central office. The DAA 34 thus serves as an interface between the present system and the telephone system in the well known manner.

The remainder of the circuitry of FIG. 1 comprises the binary synchronous communications control system of the invention. It will be understood that a plurality of like binary synchronous control systems could also be connected to the buss 18, as required. However, for simplicity of description, only one binary synchronous control system will be illustrated and described.

The DAA 34 is connected to the modem 36 which may comprise, for example, a 201A data set manufactured by the American Telephone & Telegraph Company. For a more detailed description of the 201A data set, reference is made to the technical reference entitled "Data Sets 201A and 201B", published Aug. 1969 by the American Telephone & Telegraph Company. Briefly, the data set 201A transmits serial binary data over conventional voice band telephone lines using phase shift keying (PSK) modulation. A transmitter in the data set 201A converts serial binary data to bit pairs, called dibits, which modulate a carrier. Each dibit is encoded to one of four possible carrier phase shifts. The telephone line signal therefore comprises a serial train of phase shifted signaling elements at one half the bit rate. After filtering and shaping, the telephone signal spectrum occupies a band width equal to the bit rate, centered about the carrier frequency.

A modem driver circuit 38 is connected between the modem 36 and a micro circuit control 40. The control 40 is connected to the data buss 18 and is interconnected with a micro central processing unit (CPU) 42. The micro CPU 42 is interconnected with a CRC register and control 44.

The computer 10 controls the output of data on the data buss 18 by placing data on the buss and generating control signals to tell which of the various control devices 20, 24, 28 or 40 should accept the data. This is accomplished by providing a different address for each of the control devices.

In operation of the binary synchronous system shown in FIG. 1, tone data being transmitted on the telephone line in serial form at relatively low speed is applied through the DAA 34. This tone data is converted into electrical digital signals by the modem 36 and applied through the driver 38 to the micro circuit control 40. The driver 38 reduces the level of the signals to desired levels for operation in the micro circuit control 40. For example, the magnitude of the digital signals generated by the modem 36 will generally range from +3 to +25 volts and −3 to −25 volts. The output of the driver 38 for a logic 1 or true is +2.4 volts for a 0 or false is +0.4 volts.

The micro circuit control 40 converts the serial digital data into a parallel high speed data stream that is applied to the micro CPU 42. The micro CPU 42 receives the synchronous bit stream from the micro circuit control 40 and breaks the bit stream up into characters each 8 bits long. In order to establish synchronization, one of the characters is termed a synchronous character and is initially received by the micro CPU 42. As will be later described in detail, a comparator circuit detects the synchronous character and triggers a flip-flop circuit to lock the circuit on sync. The comparator is disabled in order that data later received is not accidentally designated a sync character. Once the circuit is locked into synchronization, a shift register provides a character clock every 8 bits in order to enable a character to be read. The micro CPU 42 thus operates to designate valid characters to prevent the generation of erroneous data because of noise or the like. The micro CPU circuitry also blocks the data into message blocks and transmits the message blocks through the micro circuit control to the data buss 18 for input into the computer 10.

The provision of the micro CPU 42 is an important aspect of the invention, in that data handling such as synchronization and blocking and unblocking of the data may be accomplished exterior to the computer 10. As will be subsequently described in greater detail, the micro CPU 42 may comprise a relatively inexpensive and simple circuit, and therefore the computer 10 is relieved of a substantial amount of software requirements. This also enables the computer 10 to operate as a true message switcher, as the computer 10 may operate upon messages rather than data blocks.

The CRC register and control 44 performs cyclic redundancy checks (CRC) upon the message blocks within the micro CPU 42 prior to transmission of the message blocks to the computer 10. The register and control 44 generates CRC error detection codes which are a powerful method of block checking. Basically, the CRC is a division performed using the numeric binary value of the message as a dividend, the dividend being divided by a constant. The quotient is discarded, and the remainder serves as the check character which is then transmitted as a block check (BCC) character immediately following a check point character. The CRC register and control 44 compares a transmitted remainder to its own computed remainder and finds no error if they are equal. Only after no CRC error is found is a message block transferred to the computer 10.

The CRC computation is described in greater detail in the publication entitled "General Information--Binary Synchronous Communication," published December 1969 by IBM Systems Development Division.

Another important aspect of the invention is that the system operates in the transparent-text mode wherein line control characters may be utilized either as control commands or as text data. As an example, a particular line control character is data link escape (DLE). In order to transmit data containing DLE not used as a control character, a second DLE is added to the data block. When the micro CPU 42 detects a DLE DLE, one of the DLEs is thrown away and the second DLE is accepted. This enables the data utilized with the present system to be completely transparent. Operation of the transparent mode will be later described in greater detail.

Because the micro CPU 42 and the CRC register and control 44 operate upon the data prior to input into the computer 10, the computer 10 is not required to perform synchronization, blocking and error check functions, but sees only a series of valid characters streaming in from the data buss 18. The present binary synchronous system thus provides a substantial reduction in expense and complexity of software within the computer 10 and enables the capacity of the computer 10 to be utilized for other functions.

The micro CPU 42 also accepts data from the data buss 18 which was output from the computer 10. During such operation, the micro CPU 42 fills a buffer with the data transmitted from the computer 10. When the buffer is filled with 160 characters, the buffer is full and a flag is transmitted to the computer 10 to stop the transmission of data. When data is shifted from the buffer, the flag indicates that additional data may be accepted. The data is blocked and suitable control and CRC characters are added to the message blocks. The data is then transmitted through the micro circuit control 40 to the telephone lines for reception by a proper terminal.

Figure 2:
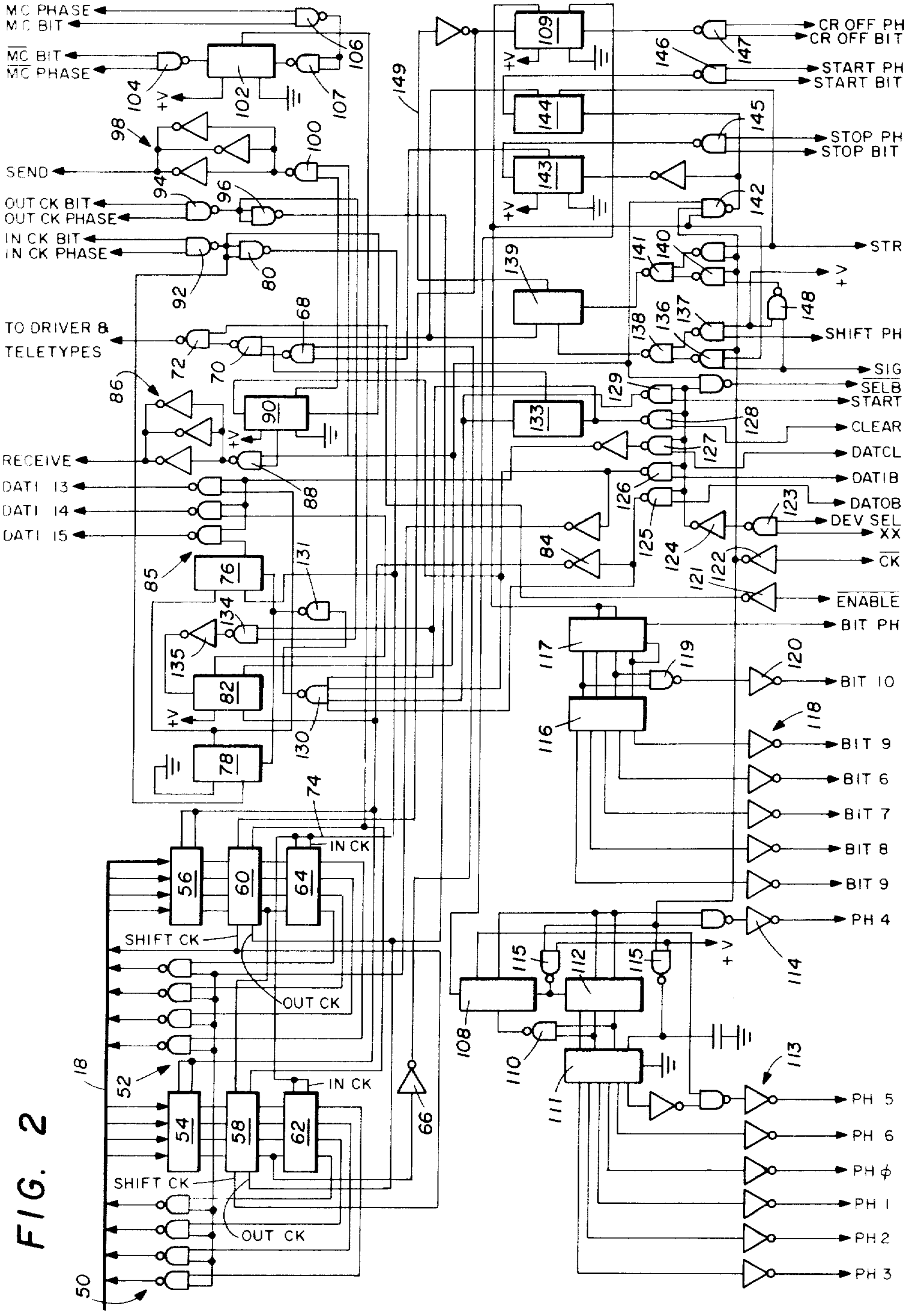
FIG. 2 illustrates an electrical schematic diagram of a typical asynchronous control device for connection to the high speed buss of the system shown in FIG. 1.

In order to fully describe how the present binary synchronous system may be interconnected along data buss 18 with asynchronous circuit control devices, FIG. 2 illustrates the five level asynchronous control system 20 in schematic detail. The high speed data buss 18 for providing input and output to the computer 10 is connected to four NAND gates 50 and four NAND gates 52 which operate to gate 8-bit data onto the data buss 18. A 4-bit register 54 and a 4-bit register 56 are also connected to gate 8-bit data from the data buss 18. The output of register 54 is connected to a 4-bit shift register 58, while the output of register 56 is connected to a 4-bit shift register 60. The output of shift register 58 is connected to a 4-bit input holding register 62, while the output of register 60 is connected to a 4-bit input holding register 64. The output of register 62 is connected to inputs of the gates 50, while the output of register 64 is connected to inputs of the gates 52.

An output of register 58 is connected through an inverter 66 and through NAND gates 68, 70 and 72 to the drive and teletype lines in the manner shown in FIG. 1. Gating signals are applied to registers 62 and 64 via a lead 74 connected to a flipflop 76 which in turn is connected to a flipflop 78. Gating signals are applied to registers 54 and 56. Gating signals are also applied to registers 62 and 64 from a NAND gate 80.

Gating signals are applied to registers 54 and 56 from a flipflop 82 and from an inverter 84. Three NAND gates 85 are interconnected as illustrated to clock the outputs of flipflops 76, 78 and 82 to the data buss 18. Three inverters 86 are connected through a NAND gate 88 to a flipflop 90. This circuitry operates to drive lamps, not shown, to indicate whether the system is in a receive mode. A NAND gate 92 is connected to the inputs of NAND gate 80 and then are connected to an output of flipflop 78 in order to control the loading of the input registers in the manner to be subsequently described. A NAND gate 94 is connected through a NAND gate 96 to registers 58 and 60 to control the loading thereof. Three inverters 98 are interconnected through a NAND gate 100 with the flipflop 90 in order to provide control of send mode lamp drivers.

Operation of a flipflop 102 is controlled by gating signals applied through a NAND gate 104 and NAND gates 106 and 107. The Q output from flipflop 102 is applied to control the mode of operation of the registers 58 and 60. Registers 58 and 60 may be loaded with either serial data bits or parallel data bits. Operation of flipflop 102 determines whether the registers 58 and 60 are operating in either the serial or the parallel mode. Control signals for flipflop 102 are provided by a phase generator and a bit generator.

The phase generator comprises a flip flop 108, the R terminal of which is connected to the Q terminal of a flipflop 109. The remainder of the phase generator circuitry comprises a NAND gate 110 connected between a BCD decoder 111 and a three bit divide-by-eight counter 112. The outputs of the decoder 111 are applied through six inverters 113 which generate phase control signals PHO-3 and 5–6. A seventh phase signal PH4 is applied via an inverter 114. These phase control signals are utilized for various controls throughout the system and particularly for control of operation of flipflop 102. Clock signals are applied to the phase generator via NAND gates 115.

The bit generator generally comprises a BCD decoder 116 and a divide by 16 binary counter 117. The output of decoder 116 is applied through inverters 118 to provide five bit signals BIT 0 and 6–9. A bit signal BIT 10 is generated via a NAND gate 119 and an inverter 120. These bit control signals are utilized for various control purposes including the control of flipflop 102.

An enable signal is applied through an inverter 121 to gate 72 to control the output to the teletype lines. Clock signals for the system are applied through an inverter 122. A Device Select command from the computer 10 is applied through a NAND gate 123 and through an inverter 124 to five NAND gates 125–129. An XX address signal is also applied to NAND gate 123 from an address register. The output of NAND 125 is applied through an inverter 84 and to an input of a NAND gate 130 which controls, along with NAND gate 131, the operation of flipflops 76 and 78.

The output of NAND gate 126 is applied through an inverter to inputs of the NAND gates 50 and 52 in order to control the gating of data onto the high speed data buss 18. The output of gate 126 is also applied to an input of NAND gate 130 and to the flipflop 90. The output of NAND gate 127 is applied through an inverter to inputs of the NAND gates 84. The output of gate 128 is connected to a flipflop 133 which may be operated to provide an open line signal to NAND gate 70 to maintain the teletype lines open when desired by the computer. Flipflop 133 is also connected to an input of NAND gate 130 and through a NAND gate 134 and an inverter 135 to the flipflop 82. The output of NAND gate 126 is connected to the flipflop 133 and also to an input of NAND gate 130 for control thereof.

NAND gates 136 and 137 receive signal and phase shift signals for control of a NAND gate 138 connected to a counter 139. Counter 139 counts the phases of the bits which indicate spacing and does not provide a count when the bits indicate marking. The signal inputs of NAND gate 137 are connected through a NAND gate to NAND gates 140 and 141. The output of gate 141 is also connected to the counter 139. Inputs of gates 136 and 140 are connected to inputs of a NAND gate 142 which is connected to a shifter control flipflop 143 and a start flipflop 144. Stop phase and stop bit signals are applied through a NAND gate 145 for control of the flipflop 143. Stop phase and stop bit signals are also applied through a NAND gate 146 for control of the flipflop 144. Off phase and Off bit signals are applied through a NAND gate 147 for control of the flipflop 110.

The flipflop 144 is set by a stroke pulse applied from NAND gate 142. An input to gate 142 is applied from the flipflop 82 to indicate that the output register has data ready to be shifted. When the start flipflop is set, the mode control of the register is set to parallel so that the data may be shifted out into parallel and to the data buss 18. Upon receipt of the next clocking pulse by the output register, the data is shifted to the data buss.

The shifter control flipflop 143 is started by a start bit on the line signal applied through NAND gates 136 and 138 to the flipflop 139. Normally, a low input is received from the driver card, not shown, and applied to the NAND gate 136. When the signal goes high to the NAND gate 136, the data is clocked through NAND gates 148 and 140 and 141 to the counter 139.

The counter 139 counts the phases of the bits which indicate spacing and does not count when the bits indicate marking. The counter provides a count to four and provides an indication that phase four of the pulse has been received. The counter 139 generates an indication on lead 149 in order to turn on flipflop 109. Operation of flipflop 109 releases the bit and the phase counters and serial data is then clocked through the system.

After the end of the fifth data bit, the mode control is switched to parallel and no more data is shifted out. The stop bit is then clocked from the flipflop 143. Flipflop 143 is reset by a signal applied from NAND gate 142 through an inverter. Flipflop 143 normally holds the line in the marking position. The resetting of the flipflop 143 frees the line for spacing position until the fifth data is transmitted. NAND gate 145 turns the flipflop 143 back on to hold the line closed again. As the system is asynchronous, once the flipflop 143 is stopped, the line is closed again until the system receives another start bit from the line or a command from the computer 10 to load the output register.

The flipflop 82 provides an indication when the output buffer is ready for additional data. The flipflop is set by a signal applied from the NAND gate 125 and the flipflop is cleared by a clock signal. The flipflop 76 provides an indication of an error when data is in the input buffer and another character is erroneously clocked in. The NAND gates 84 clock the outputs of flipflops 70 and 82 onto the data buss.

In operation, when the system is in the transmit mode, 8-bit parallel data is received from the computer over the high speed data buss 18 and is loaded into the registers 54 and 56. As soon as the conditions are right, as indicated by stopping of the shifter control flipflop 143, the data is shifted into registers 58 and 60. The registers 58 and 60 at this time have been shifted by remote control into the serial mode, such that the data is shifted out of the registers 58 and 60 in a serial manner. The serial data may then be shifted through the inverter 66 and outwardly through NAND gates 68, 70 and 72 to the driver circuitry and the teletype lines. The data is then visually printed out at the addressed teletype.

When the system is in the receive mode, serial data is loaded into registers 58 and 60 through an inverter from the teletype lines. When the data is desired by the computer, the registers 62 and 64 receive the data in parallel form. Upon command by the computer, the parallel data is then read out through the NAND gates 50 and 52 onto the high speed data buss 18 for transmission to the computer 10. Control of the system is provided by the phase generator which generates timing signals indicating when to clock data in and out and when to clock stop bits and the like.

An asynchronous control system similar to the circuitry shown in FIG. 2 is manufactured and sold by Action Communication Systems, Inc. of Dallas, Texas. A large number of such asynchronous control devices 20 may be connected to the high speed data buss 18 shown in FIG. 1. Additionally, a plurality of universal asynchronous control circuits which operate generally along the same lines as that shown in FIG. 2, may also be connected along a high speed data buss 18. An important aspect of the present invention is that the novel binary synchronous control device of the invention may be connected to the high speed data buss 18 and operate along with the plurality of asynchronous control devices also connected along the data buss.

Figure 3:
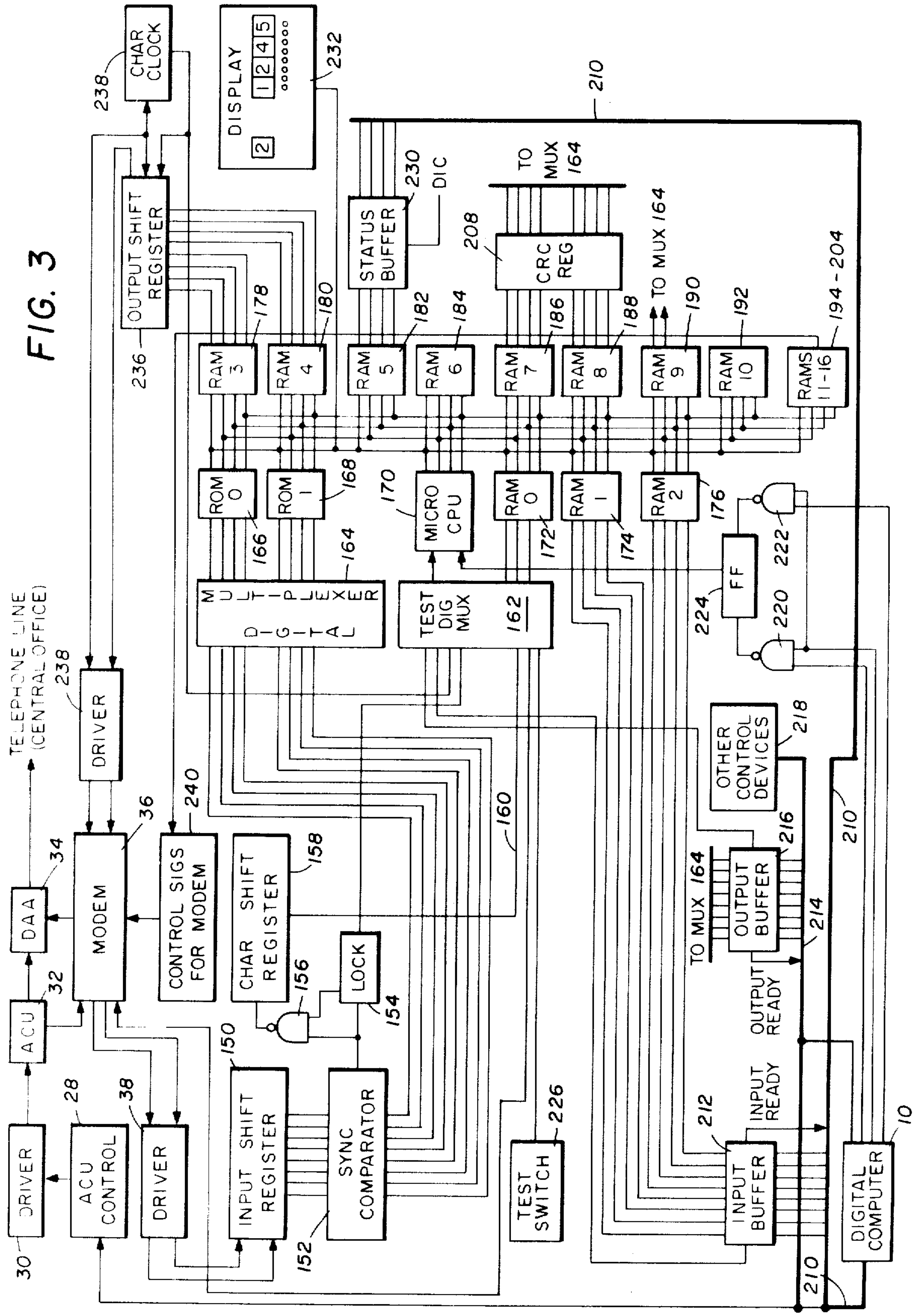
FIG. 3 is an electrical block diagram of the binary synchronous communications control system of the invention.

Referring to FIG. 3, wherein like numbers are utilized for like and corresponding elements previously described in FIG. 1, a leased or designated telephone line is connected to the data access arrangement (DAA) 34 which serves to interface between the telephone line and the automatic calling unit (ACU) 32 and the modem 36. The ACU 32 is connected through the driver 30 to the ACU control circuit 38, to be subsequently described in greater detail. The modem 36 is connected through a driver 38 to an input shift register 150.

The input shift register 150 comprises an eight bit shift register for converting the serial data applied from the driver 38 into eight bit parallel data. The driver 38 also provides a clock signal to the register 150. The output of the register 150 is applied to a sync comparator 152 which detects a predetermined sync character which is a unique eight bit block character. When the comparator 152 detects the sync character, synchronization is established and the lock flip flop 154 is actuated. A NAND gate 156 locks a character shift register 158 into a sync mode. After synchronization is established, a clock signal is generated from the character shift register 158 each eight bits and is applied via lead 160 to a test digital multiplexer 162 to maintain the system in synchronization.

The parallel data is applied from register 150 through the sync comparator 152 to a digital multiplexer 164. Multiplexer 164 multiplexes the incoming data with outgoing data in a manner to be subsequently described. The output of the multiplexer 164 is connected to the input lines of read only memories (ROM) 166 and 168. ROMs 166 and 168 comprise semi-conductor chips which store a micro program for operation of the micro central processor unit (CPU) 170. ROMs 166 and 168 are programmed by the use of a custom metal mask. A suitable ROM for use with the present invention is the 4001 ROM manufactured and sold by the Intel Corporation, Santa Clara, California.

The output from the digital test multiplexer 162 is applied to the input of the micro central processor unit (CPU) 170. The micro CPU 170 is the heart of the present system and performs a plurality of operations upon the input data prior to inputting the data into the message switching computer 10. In the preferred embodiment, the micro CPU 170 comprises a single chip unit which operates upon four parallel bits at a time. A suitable micro CPU for use with the invention is the 4004 CPU manufactured and sold by Intel Corporation. The 4004 CPU and associated circuitry are sold in a complete system under the trade name MCS-4 Micro Computer Set by Intel Corporation.

The four inputs of the micro CPU 170 are connected to the terminals of ROMs 166 and 168 and are also connected to each of the terminals of 16 random access memories (RAMs) 172–204. RAMs 194–204 are illustrated in a single electrical block for ease of illustration. In the preferred embodiment, the RAMs 172–204 comprise the 4002 RAM manufactured and sold by Intel Corporation as a portion of the MCS-4 system. Each of the RAMs 172–204 may store 320 bits arranged as four registers of twenty 4-bit characters each. In addition, each of the RAMs includes four output lines and associated control logic to perform output operations.

For a detailed description of the construction and operation of the MCS-4 Micro Computer Set, reference is made to the "MCS-4 Micro Computer Set User's Manual" published in March, 1972, by Intel Corporation of Santa Clara, Cal.

Basic execution of the MCS-4 system requires 8 cycles of a 750 KHz clock. In a typical sequence, the micro CPU 170 sends 12 bits of address (in three four-bit bytes on the computer data buss) to the ROMs 166 and 168 in the first 3 cycles of operation. This address selects one out of the ROMs and one out of the 256 eight bit words in the selected ROM. The selected ROM transmits back eight bits of instruction to the micro CPU 170 in the next 2 cycles of operation. This instruction is sent over the four line data buss to the micro CPU 170. The instruction is then interpreted and executed in the final three cycles of operation. Each of the four command control lines on the CPU 170 controls a set of four RAMS. The address of a RAM chip, register and character is stored in two index registers in the micro CPU and is transferred to the RAM during the time when the RAM instruction is executed. When the RAM output instruction is received by the CPU 170, the content of the CPU accumulator is transferred to the four RAM output lines.

The output of RAMs 186 and 188 are connected to a CRC register 208. Register 208 calculates the cyclic redundancy check code of the next message block before transmittal to the digital computer 10, in a manner to be subsequently described. The micro CPU 170 then compares the calculated CRC error signal with the CRC character transmitted in the incoming data to determine the accuracy of the incoming data. The output of the CRC register 208 is applied through the input of the multiplexer 164 for input into the micro CPU 170.

The digital message switching computer 10, previously described in FIG. 1, is connected to a high speed input data buss 210 which is connected to the output of an input buffer 212. The inputs of the input buffer are connected to RAMs 174 and 176. The computer is also connected to a high speed output data buss 214 which is connected to the input of an output buffer 216. Data busses 210 and 214 comprise the previously described data buss 18. A plurality of other communication control devices 218, such as the asynchronous control devices and automatic calling units described in FIG. 1, are connected along the data buss 214. Additional binary synchronous circuits such as shown in FIG. 3 may be attached along the data buss 214.

The output of the buffer 216 is connected to the multiplexer 164. Computer 10 is connected through NAND gates 220 and 222 to a flip-flop circuit 224 to provide a reset signal for operation of the micro CPU 170.

The test digital multiplexer 162 receives inputs from a test switch 226 and from various other inputs including the input buffer 212, the character shift register 158, the output buffer 216, the modem 36 and the like. The test digital multiplexer 162 thus generates a test indication signal to the micro CPU 170 to indicate when data has been accepted to allow processing of additional data by the micro CPU 170.

The output of RAM 182 is connected to a status buffer 230, the output of which is connected to the input data buss 210 connected to the computer 10. The buffer 230 provides a status check on a plurality of input and output data conditions for control of the flow of data through the system by means of gating signals.

A visual display 232 is connected to one of the output busses of the micro CPU 170 to provide an indication of the test multiplexer input and the ROM address that is presently being executed. Additionally, lights are provided on the display 232 to indicate the state of the function input to the test multiplexer.

The outputs of RAMs 178 and 180 are applied to an output shift register 236, the operation of which is controlled by a character clock 238. The clock 238 also supplies clock signals to the test digital multiplexer 162. The output of the shift register 236 is applied through a driver 238 to the modem 36 to enable transmission of data to the telephone lines. The output of one of the RAMs 194–204 is applied to a control signal generator 240 for the modem 36 for control thereof.

Binary synchronous operation of the present system is accomplished according to the accepted conventions set forth in such publications as "General Information-Binary Synchronous Communications" published by the IBM Systems Development Division, Communications Systems Publications, Research Triangle Park, N.C. 27709, in Dec. 1969. In the preferred embodiment of the invention, the transmission code set known as the Extended Binary Coded Decimal Interchange Code (EBCDIC) is utilized for line control characters. The code set known as the United States of America Standard Code for Information Interchange (USASCII) is utilized for the transmission of text data. As will be subsequently described, these codes are utilized in the transparent mode to increase the flexibility of the present system, since all possible bit configurations are treated as "data only" within transparent text.

Message transmission according to the present invention comprises one or more blocks of text data. The text is transmitted in blocks to provide a more accurate and efficient error control. The text data is the body of the message and is identified by a start of text (STX) line control character immediately preceding its block of text. In addition, each block of text except the last block is immediately followed by an end of transmission block (ETB) line control character or an intermediate block (ITB) character. The last clock of text data in a message is immediately followed by an end of text (ETX) character.

The text of the message is generally preceded by a heading that contains auxiliary information such as station control, priority and the like pertaining to the text data. The heading is identified by the start of heading (SOH) character immediately preceding it. As previously noted, as each message block is completed, the block is checked for transmission accuracy at the receiver before the transmission continues. While a number of error checking procedures are available, in the preferred embodiment cyclic redundancy checking (CRC) is utilized.

As outlined in more detail in the above-identified IBM publication, control of the present communications system is maintained by the use of line control characters and sequences. The following is a listing of the more commonly used characters:

SYN-Synchronous Idle
SOH-Start of Heading
STX-Start of Text
ITB-End of Intermediate Transmission Block
ETB-End of Transmission Block
ETX-End of Text
EOT-End of Transmission
ENQ-Enquiry
ACK O/ACK 1-Alternating Affirmative Acknowledgments
WACK-Wait-Before-Transmit Positive Acknowledgment
NAK-Negative Acknowledgment
DLE-Data-Link Escape
RVI-Reverse Interrupt
TTD-Temporary Text Delay
DLE EOT-Disconnect Sequence for a Switched Line For further descriptions of the above-captioned line control characters, reference is made to the aforesaid IBM publication.

An important aspect of the present invention is the operation of the system in the transparent-text mode which permits wide versatility in the range of coded data that may be transmitted. In this mode, all data, including the normally restricted data-link line control characters, are treated only as specific "bit patterns" when transmitted. Thus, unrestricted coding of data is permitted for transparent mode operation. All line control characters may thus be transmitted either to provide control functions or as transparent data without taking on a control meaning.

In order to be recognized as a control function, all line control characters transmitted during transparent data text mode must be preceded by a DLE. Thus, the following sequences are effective during transparent-mode operation to provide control functions:

DLE STX initiates the transparent mode for the following text

DLE ETB terminates a block of transparent text, returns the data link to normal mode, and calls for a reply DLE ETX terminates the transparent text, returns the data link to normal mode, and calls for a reply DLE SYN used to maintain synchronization or as a time filled sequence for transparent-mode DLE ENQ initiates "disregard this block of transparent data" and returns the data link to normal mode DLE DLE used to permit transmission of DLE as data when a bit pattern equivalent to DLE appears within the transparent data. One DLE is disregarded by the system, the other is treated as data.

DLE ITB terminates an intermediate block of transparent data, returns the data link to normal mode, and does not call for a reply. The block check character follows DLE ITB.

Operation of the circuit shown in FIG. 3 will initially be described in the operating mode wherein binary coded tone signals are transmitted from a terminal over the telephone line to the DAA 34. The binary coded tone signals are transmitted through the DAA 34 to the modem 36, wherein the tones are converted into serial electrical binary coded signals. The electrical binary coded signals are applied through the driver 38, along with clock signals, and are input into the input shift register 150.

The serial binary electrical signals are converted by the register 150 into eight bit parallel digital signals which are applied to the sync comparator 152. The initial character transmitted will generally be a predetermined sync character which is detected by the comparator 162. Upon such detection, the lock 154 is energized to lock the register 158 in the synchronization. The comparator 162 is thereafter disabled and register 158 generates a character clock each eight bits to maintain the system in synchronization. The outputs of the lock 154 and the register 158 are applied to the test digital multiplexer 162 to provide an indication of the status of operation. The parallel synchronized digital signals are then applied through the multiplexer 164 to the micro CPU 170. The operation of the micro CPU 170 is determined by the stored programs in the ROMs 166 and 168.

Initially, the micro CPU 170 detects the transmitted sync character and strips the line control sync character from the remainder of the data. The micro CPU 170 then looks for the start of a message block which is indicated by the data link escape character (DLE) and a start of text character (STX). After detection of these line control characters, all of the characters following are stored in the selected ones of the RAMs 172-204. In the preferred operation of the invention, a message block is normally 160 characters long and ten characters are thus stored in each of the RAMs 172-204.

At the end of a message block, a sequence of a DLE and end of block (ETB) or end of transmitting of text (ETX) is detected by the micro CPU 170 to terminate the message block. The next characters received by the micro CPU 170 are cyclic redundancy check (CRC) error characters. These CRC characters have been calculated by the transmitting remote terminal and are descriptive of the content of the transmitted data. The characters contained in the message block are input into the CRC register 208 and a resulting CRC error check signal is computed by the register 208. The micro CPU 170 then compares the transmitted CRC character with the CRC error check character generated by the register 208. If the two characters agree, the message block stored in the RAMs 172-204 is accurate and the micro CPU 170 transfers the message block to the input buffer 212. The message block is then fed to the high speed data buss 210 for input into the computer 10. The computer 10 then checks the data for format and stores the data for subsequent transmission to the designated station.

An important aspect of the invention is that the micro CPU 170 and the associated circuitry synchronizes the incoming digital signals and arranges the text signals into a message block prior to input into the computer 10. Thus, the present system eliminates the requirement of a substantial amount of programming and resultant workload upon the computer 10. Additionally, the micro CPU 170 and associated circuitry is relatively inexpensive, and thus a plurality of additional terminals may be added to an overall system by connection to the high speed data buss 214, without overloading the capacity of the computer and without the requirement of expensive programming changes.

When it is desired to transmit stored data from the computer 10 to a terminal on the telephone line, the computer 10 initiates the automatic dialing of the number by the ACU 32 through the DAA 34. When a communication link has been established, the modem 36 is interconnected to the DAA to convert the generated electrical digital signals into tone signals for transmission over the telephone line.

The computer 10 then initiates operation of the micro CPU 170 and its associated circuitry and transmits parallel data to the high speed output data buss 214. The data is buffered through the output buffer 216 and is applied through the multiplexer 164 to the micro CPU 170. When the buffer 216 is filled with 160 characters, input is stopped by transmittal of a flag from the micro CPU 170 to the computer. As the characters are read in by the micro CPU 170, CRC characters are calculated by the CRC register 208 and are stored in the RAM memories. Once a message block is completely filled, or if the computer 10 sends a signal which indicates that the block is completed, the micro CPU 170 brings the message block out of RAM memory and inputs the block into the output shift register 236. The micro CPU 170 adds the desired line control characters such as the sync character and starting and end of message characters, to the message block prior to output through the shift register 236. The test multiplexer 162 generates a test signal to the micro CPU 170 to indicate that the data has been accepted within the register 236 and additional characters are accepted by the CPU 170 and processed. The data within the shift register 236 is converted into serial electrical digital data and is transmitted through the driver 238 to the modem 36. The electrical digital data is converted into binary coded tone data and is transmitted through the DAA 34 to the telephone line for transmission to the designated terminal.

FIG. 4 illustrates in schematic detail the circuitry of the input shift register 150, the sync comparator 152 and associated circuitry. The serial input signals applied from the modem 36 and drivers 38 are applied through an inverter 250 to the input of the eight bit shift register 150. The register 150 converts the serial input signals into parallel eight bit data. The parallel data is applied to the multiplexer 164 via terminals 252. The parallel eight bit data is also applied to a comparator circuit 152 comprising a pair of digital comparator circuits 254 and 256. The comparator circuits 254 and 256 are set to detect a predetermined eight bit sync character.

Upon detection of the sync character, an output is applied from the comparators to NAND gates 258 and 260 which apply a lock signal to the character shift register 158. The lock 154 operates in conjunction with the NAND gates 258 and 260 to lock the character shift register 158 into synchronization. Thereafter, the register 158 generates a character clock signal every eight bits for application to the micro CPU circuitry for synchronization thereof. Additionally, the flip-flop 154 generates lock signals which are applied to the test digital multiplexer.

Inverters 262 are connected to the input of the NAND gate 258 and the Q-terminal of the flip-flop 154. The inverters 262 are tied together at a terminal 264 to provide a Receive signal. The character shift register 158 also generates a Serial Clock Receiver and a receive clock signal.

Figure 5:
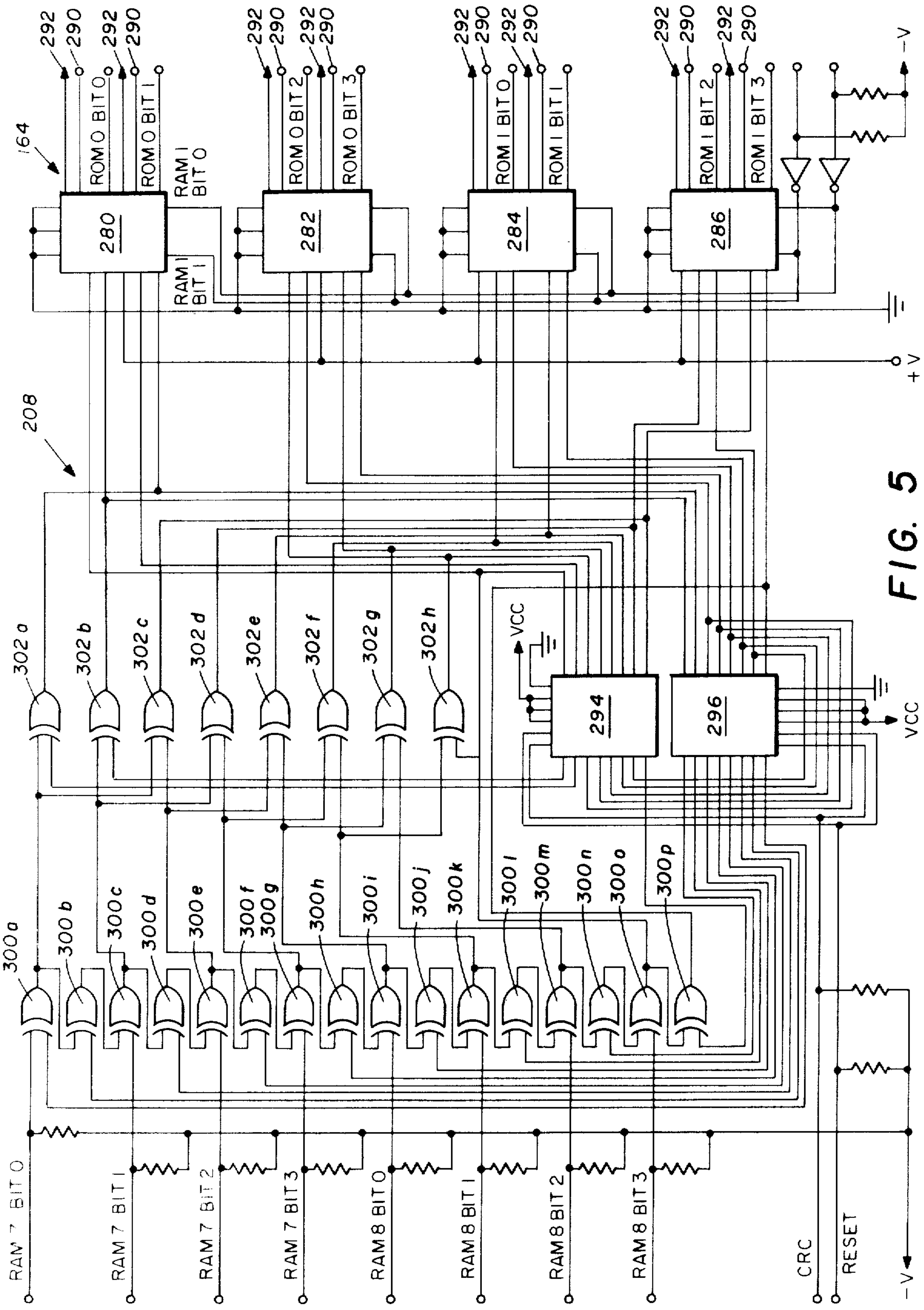
FIG. 5 is an electrical schematic of the digital multiplexers and CRC error check circuitry shown in FIG. 3.

FIG. 5 illustrates the digital multiplexer 164 and the CRC register 208. The digital multiplexer 164 comprises four multiplexer circuits 280–286. Multiplexer circuits which may be used with the circuit comprise 74153 Multiplexers. The RAM and ROM bit connections into the multiplexer are labeled at the corresponding terminals. Inputs to the multiplexer from terminal 252 from the register 150 are identified as terminals 290. Terminals connected to the output buffer 216 are identified as terminals 292.

The remainder of the circuitry shown in FIG. 5 comprises the CRC register 208. The remaining terminals of the multiplexer circuits 280–286 are connected to a pair of holding registers 294 and 296. In the preferred embodiment, the registers 294 and 296 comprise eight bit registers such as 74198 parallel input shift registers.

A plurality of exclusive OR gates **300*a–p* are interconnected to receive the outputs of RAMs 184 and 186 and the output of register 296. The input of gate 300*a* is connected to receive bit zero from RAM 186, with the second input of gate 300*a* being interconnected with register 296. The output of exclusive OR gate 300*a* is interconnected with an input of gate 300*b*. The second input of gate 300*b* is interconnected with register 296. The output of gate 300*b* is interconnected as an input with gate 300*c*. The second input to gate 300*c*** is connected to RAM 186 to receive bit one therefrom. The output of gate 300*c* is tied to the input of gate 300*d*. The second input of gate 300*d* is tied to register 296. The output of gate 300*c* is tied to the input of gate 300*e*. The second input of gate 300*e* is connected to RAM 186 to recive bit two therefrom.

The output of gate 300*e* is tied to the input of gate 300*f*, with the second input of gate 300*f* being connected to register 296. The output of gate 300*f* is tied to the input of gate 300*g*. The second input of gate 300*g* is connected to the output of RAM 186 to receive bit three therefrom. The output of gate 300*g* is tied to the input of gate 300*h*. The second input of gate 300*h* is connected to register 296. The output of gate 300*h* is tied to the input of gate 300*i*. The second input of gate 300*i* is connected to RAM 188 to receive bit zero therefrom. The output of gate 300*i* is connected to the input of gate 300*j*. The second input of gate 300*j* is connected to register 296 and the output of gate 300*j* is tied to an input of gate 300*k*. The second input of gate 300*k* is tied to RAM 188 to receive bit one therefrom. The output of the gate 300*k* is tied to an input of gate 3001. The second input of gate 3001 is connected to register 296.

The output of gate 3001 is tied to the input of gate 300*m*, while the second input of gate 300*m* is tied to RAM 188 to receive bit two therefrom. The output of gate 300*m* is connected to the input of gate 300*n* and the second input of gate 300*n* is tied to register 296. The output of gate 300*n* is tied to an input of gate 300*o*. The second input of gate 300*o* is connected to RAM 188 to receive bit three therefrom. The output of gate 300*o* is tied to an input of gate 300*p*. The second input of gate 300*p* is connected to register 294 and the output of gate 300*p* is tied to an input of register 296.

The output of gate 300*a* is connected to an input of exclusive OR gates 302*a* and 302*c*. The second output of the gate 302*a* is connected to the output of register 294. An input of gate 304*b* is connected to the output of gate 300*c*, with the second input of gate 302*b* being connected to an output of register 294. The second input of gate 302*c* is connected to the output of gate 300*e*. The inputs of gate 302*d* are connected to the outputs of gates 300*c* and 300*g*. The outputs of gate 302*e* are connected to the outputs of gates 300*e* and 300*i*. The inputs of gate 302*f* are connected to the outputs of gates 300*g* and 300*k*. The inputs of the gate 302*g* are connected to the outputs of gates 300*i* and 300*m*. The inputs of gate 302*h* are connected to the outputs of gates 300*k* and 300*o*.

The outputs of gates 302*a* and 302*b* are connected to the inputs of register 296, with the outputs of gates 302*c–h* being connected to inputs of register 294. The outputs of gates 302*a* and 302*b* are connected to multiplexer 280. The outputs of gates 302*g* and 302*h* are connected to inputs of the multiplexer 282. The outputs of gates 302*e* and 302*f* are connected to inputs of the multiplexers 284. The outputs of gates 302*c* and 302*d* are connected to inputs of the multiplexer 286.

In this manner, the outputs from the RAMs 186 and 188 (FIG. 3) are applied through the CRC register 208, wherein the CRC character for the data is computed. The CRC character is then applied through the multiplexer 164 for comparison by the micro CPU 170.

The exclusive OR gates 300*a–p* and 302*a–h* are interconnected with the registers 294 and 296 in order to compute a complex polynominal cyclic redundancy check. For a more detailed description of the CRC computation, reference is made to the publication "General Information — Binary Synchronous Communications," published Dec. 16, 1969 by IBM Systems Development Division, Communications Systems Publications of Research, Triangle Park, N.C., and additional publications listed in the IBM SRL Bibliography Supplement — Teleprocessing publication No. GA2-4-3089, published by IBM Systems Development Division.

Briefly, the CRC register 208 shown in FIG. 5 utilizes the numeric binary value of the message block stored in the RAMs as a dividend which is divided by a constant. The resultant portion of the division is discarded and the remainder serves as the CRC check character. This check character is transmitted through the multiplexer 164 for comparison in the micro CPU 170 with the transmitted CRC character for the message block. Alternatively, when the system shown in FIG. 3 is transmitting a message block, the CRC character is computed by the register 208 and is attached by the micro CPU 170 at the end of a message block for comparison at the remote station. If the compared CRC characters are equal, a high probability of accuracy of transmission results.

Figure 6:
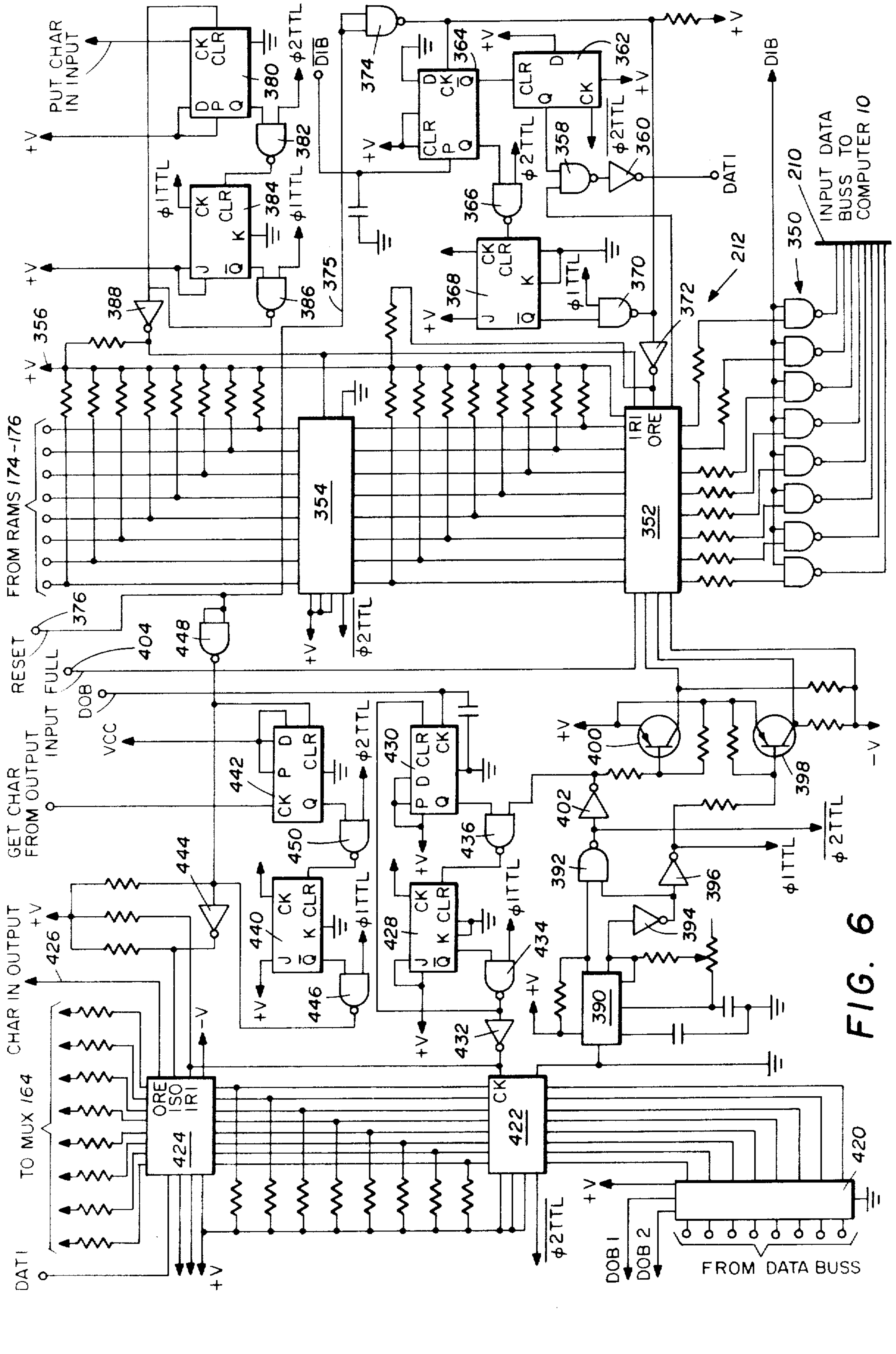
FIG. 6 is an electrical schematic diagram of the computer input and output buffers shown in FIG. 3.

FIG. 6 illustrates the input and output buffers and associated clock circuitry of the invention. The input buffer 212 comprises a plurality of NAND gates 350 connected at the outputs thereof to the high speed data input buss 210 which is connected to the computer 10. The outputs of the gates 350 are connected to the outputs of a 13 character first in, first out (FIFO) buffer 352. The gates 350 gate data from the buffer 352 to the computer 10 upon application of a DIB gating signal generated in response to a command from the computer. Buffer 352 may comprise a buffer S1709 manufactured and sold by American Micro Systems Corporation. The input of buffer 352 is connected to the output of an eight bit holding register 354 which may comprise for example a 74198 register.

The inputs to the holding register 354 are connected to receive the eight bit inputs from RAMs 174 and 176 (FIG. 3). Positive bias is applied to terminal 356 for biasing of each of the eight data lines on the input and output of the holding register 354. A status indicating terminal of the buffer 352 is connected to the input of a NAND gate 358, the output of which is connected through an inverter 360 to generate the DATI signal which indicates that data inputs from the buffer 352 are available for the high speed data buss. The second input of the gate 358 is connected to the Q-terminal of a flip-flop circuit 362. The clear terminal of the flip-flop 362 is connected to the Q of a flip-flop 364.

The Q-terminal of flipflop 364 is connected to an input of a NAND gate 366, the output of which is connected to the clear input of a flip-flop 368. The Q terminal of the flip-flop 368 is connected to a terminal of a NAND gate 370. The output of gate 370 is tied through an inverter 372 to the ORE terminal of the buffer 352. The input of the inverter 372 is also connected to the CK terminal of the flip-flop 364 and to the output of gate 374. The inputs of gate 374 are tied together and are connected via lead 375 to a terminal 376 for receiving a reset signal. Timing signals $\phi$1TTL and $\phi$2TTL, to be later described, are applied to inputs of gates 366, 370 and flip-flops 362 and 368.

A Put Character In Input Signal is applied to the CK terminal of a flip-flop 380, the Q-terminal of which is connected to an input of a NAND gate 382. The output of gate 382 is connected to the CLR terminal of a flip-flop 384. The Q output of flip-flop 384 is connected to an input of a NAND gate 386, the output of which is connected through an inverter 388 to a terminal of the holding register 354. Timing signals are applied to inputs of gates 382 and 386 and to the flip-flop 384.

A clock for control of both the input and output buffer comprises a frequency source 290, which may comprise for example an NE567V frequency source. The output of the frequency source 390 is connected to an input of a NAND gate 392 and through inverters 394 and 396 to the base of a transistor 398. The output of inverter 394 is also connected to an input of the gate 392. The output of the inverter 396 comprises a clock signal $\phi$1TTL, while the output of the gate 392 comprises a clock signal $\phi$2TTL, these clock signals being applied to various portions of the circuit previously described as indicated on the drawing.

The collector of transistor 398 is applied to the FIFO buffer 352 to provide a timing signal thereto. The emitter of transistor 398 is applied to the emitter of a transistor 400. An inverter 402 is connected to the output of gate 392 and is connected through a resistor to the base of transistor 400. The collector of transistor 400 is also applied to the FIFO buffer 352 to provide a timing signal thereto. Terminal 404 is tied to the FIFO buffer 352 to provide an indication that the input of the buffer 352 is full.

In operation of the input buffer shown in FIG. υ, data is clocked from RAMs 174–176 into the holding register 354 by operation of the flip-flops 380 and 384 upon receipt of a Put Character In Input signal by flip-flop 380. The clock signals $\phi$1TTL and $\phi$2TTL are applied from the clock in order to control the transfer of data into the register 354. Register 354 accepts the relatively high speed data from the RAMs 174–176 and holds the data therein prior to clocking into the FIFO buffer 352, which is a slower MOS device having a 100 KC clock.

Characters are shifted from the register 354 into the FIFO buffer 352 by operation of the flip-flops 362–368. The clock signals $\phi$1TTL and $\phi$2TTL control the input and output of the buffer 352. When data is stored in the buffer 352, a DATI signal is generated to the computer 10 to indicate that input data is available. When the computer desires data, the DIB signal is generated in order to gate the data through the gates 350 into the high speed data buss 210 for application to the computer 10. Upon receipt of a reset signal at terminal 376, the FIFO buffer 352 may be emptied. FIG. 6 also illustrates the output buffer 216 and its associated circuitry. A high speed holding register 420 is connected to receive data from the high speed data buss 214. The output of register 420 is directly connected to the input of a holding register 422 which holds the high speed data for clocking into a slower FIFO buffer 424. The output of the FIFO buffer 424 is applied to the multiplexer 164. A signal indicating that a character is in the output is generated at terminal 426.

Operation of the register 422 is controlled by a pair of flip-flops 428 and 430. The CK terminal of the register 422 is connected through an inverter 432 to the output of a NAND gate 434. The $\phi$1TTL clock signal is applied to one input of the NAND gate 434, with the second input of the gate being connected to the Q terminal of the flip-flop 428. The output of NAND gate 434 is also tied to the CLR terminal of the flip-flop 430. The DOB signal is applied to the CK terminal of flip-flop 430. The Q terminal of the flip-flop 430 is connected to an input of a NAND gate 436, the output of which is connected to the CLK terminal of the flipflop 428. The second input of the gate 436 is connected to receive a clocking signal from the inverter 402.

Control of the FIFO buffer 424 is provided by a pair of flip-flops 440 and 442. The ISO terminal of the buffer 424 is tied through an inverter 444 and a NAND gate 446 to the Q terminal of the flip-flop 440. The $\phi$1TTL signal is applied to the second input of the NAND gate 446. The inverter 444 is also connected to the output of a NAND gate 448 to receive the reset signal applied to terminal 376 in order to clear the FIFO buffer 424 when desired. The output of NAND gate 448 is connected to the clear terminal of the flip-flop 442. The Q terminal of the flip-flop 442 is connected to an input of a NAND gate 450, the output of which is connected to the clear terminal of flip-flop 440. The second input of gate 450 is connected to receive the $\phi$2TTL clock signal.

In operation of the output buffer shown in FIG. 6, the DOB 1 and DOB 2 signals are applied to the register 420 in order to gate data from the computer 10 via the high speed data buss 214 into the register 420. The register 420 accepts the high speed parallel data and shifts the data into the holding register 422 under the control of the flip-flops 428 and 430 which are gated by the clocking signals $\phi$1TTL and $\phi$2TTL. The data within the register 422 is then clocked into the FIFO buffer 424 under the control of flip-flops 440 and 442 which are controlled by the clocking signals $\phi$1TTL and $\phi$2TTL. A Get Character From Output signal is applied at the CK terminal of flip-flop 442 when it is desired to apply data to the multiplexer 164. The data is then applied to the multiplexer 164 for application to the micro CPU 170 in order to construct a message block for transmission under the control of the computer 10.

Figures 7, 8:
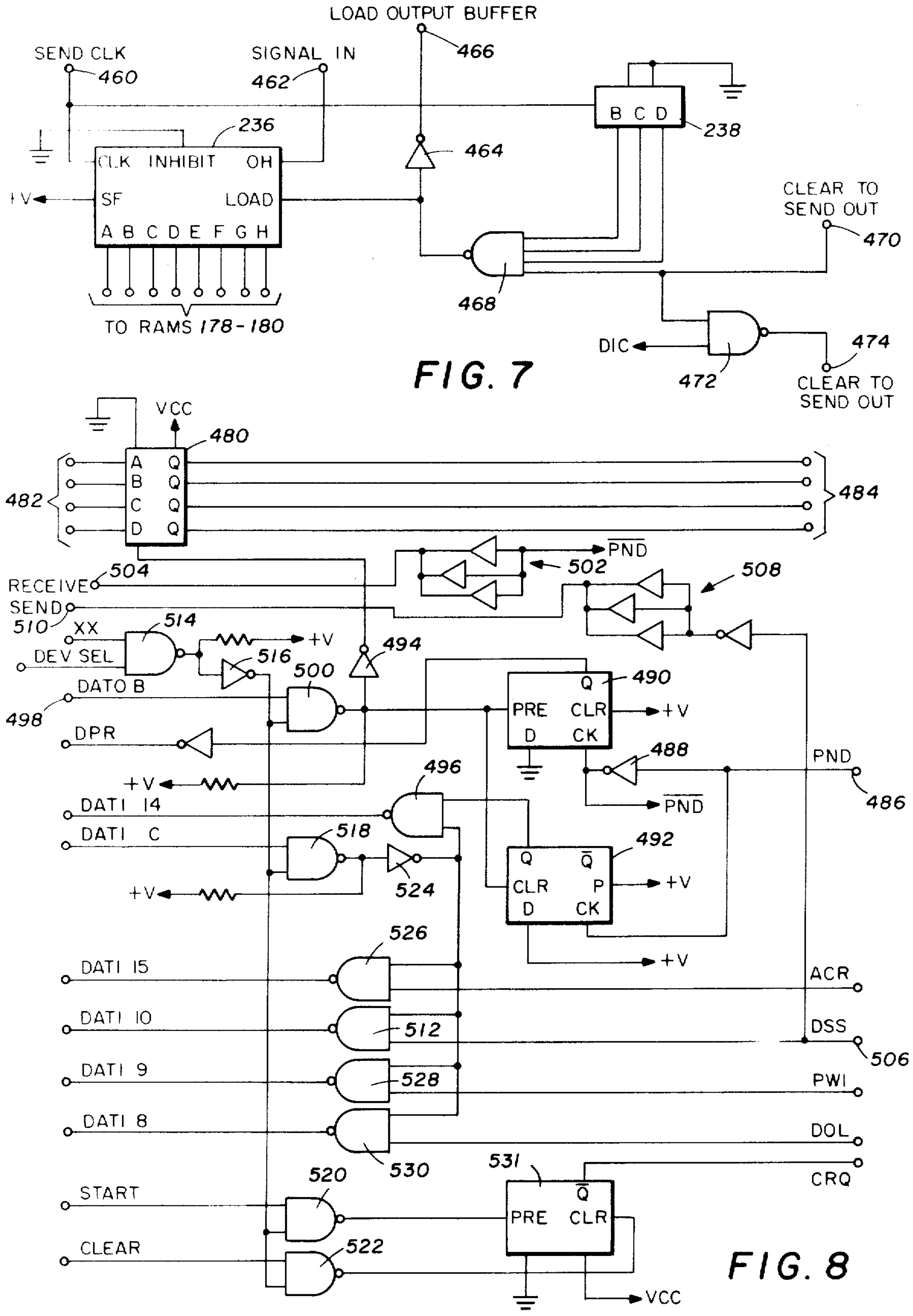
FIG. 7 is an electrical schematic of the output shift register and character block shown in FIG. 3.
FIG. 8 is an electrical schematic of the automatic call unit control shown in FIG. 1.

FIG. 7 illustrates in schematic detail the output shift register 236 and the character clock 238 previously shown in FIG. 3. The 8-bit inputs to the register 236 are connected to RAMs 178 and 180 to receive message blocks constructed by the micro CPU 170. A Send Clock signal is provided at terminal 460. The OH terminal of the register 236 is connected to terminal 462 upon which is applied a Signal In signal. The load terminal of the register 236 is connected through an inverter 464 to terminal 466 to provide an indication to load the output buffer 216 (FIG. 3) with additional data. The terminals of the clock 238 are applied as inputs to a NAND gate 468, the output of which is connected to control the loading of the register 236. An input of the gate 468 is controlled by a Clear To Send In signal applied to terminal 470. This input is also applied to an input of a NAND gate 472 which outputs a Clear To Send Out signal at terminal 474. The second input to gate 472 is the DIC signal previously shown.

In operation of the circuitry shown in FIG. 7, parallel data is received from the RAMs 178 and 180 by the register 236 under the control of the clock 238. The parallel data is then clocked out from register 236 as serial binary data at terminal 462 for application to the driver 238 (FIG. 3). The serial data is then converted into tone data by the modem 36 and applied to the telephone lines in the manner previously described.

FIG. 8 illustrates in schematic detail the automatic calling unit (ACU) control 28 shown in FIG. 3. As previously noted, the ACU control 28 controls through a driver 30 an automatic calling unit (ACU) such as a 801A Bell Telephones ACU unit. A register 480 receives data from the high speed data buss 18 at terminals 482. The data is clocked through the register 480 and applied to a driver, not shown, which is connected to terminals 484 of the register 480. The driver 30 transforms the relatively low logic level signals into higher EIA signals for application to the ACU 32.

A PND signal is applied to terminal 486 and is applied through an inverter 488 to the clock terminal of a flip-flop 490. The PND signal is also applied to the clock terminal of a flip-flop 492. The PRE and CLR terminals of flip-flops 490 and 492 are tied together through an inverter 494 to provide control to the shift register 480. The Q terminal of flip-flip 492 is connected through a NAND gate 496 to generate a DATI 14 signal to indicate to the computer 10 that another digit may be sent to the ACU.

A DATOB signal is applied at terminal 498 and is applied as an input to a NAND gate 500, the output of which is connected to PRT and CLR terminals of flip-flops 490 and 492. The DATOB signal is generated from the computer to reset the flip-flops.

A PND is applied through three inverters 502 to provide a receive signal at terminal 504. A data set status (DSS) signal is applied to terminal 506 and is applied through inverters 508 to provide a send signal at terminal 510. In addition, the DSS signal is applied as an input to NAND gate 512. A device select (DEV SEL) and an XX address signal are applied to inputs of a NAND gate 514 and are applied through an inverter 516 to inputs of NAND gates 500, 518, 520 and 522. NAND gate 518 is connected through an inverter 524 to the inputs of NAND gate 496 and inputs of NAND gates 526, 512, 528, and 530. An abandoned call and retry signal (ACR) is applied to an input of gate 526.

The ACR signal is provided from the ACU 32 (FIG. 3) and is a timing signal which begins timing as soon as the number is dialed. After the dialing has been completed and there is no response within a predetermined time, within a range of approximately 7 seconds to 45 seconds, a DATI 15 signal is generated to indicate to the computer 10 that the call should be abandoned and another dialing initiated.

After the particular ACU control device shown in FIG. 8 has been selected by receipt of the proper DEV SEL signal at gate 514, a start (STRT) signal is applied to the second input of gate 520 and a flipflop 531 is set to generate a call request (CRQ) signal. The CRQ signal effectively takes the telephone off the hook. If it is desired to put the telephone back on the hook, a clear (CLR) signal is applied to an input of gate 522 which switches flipflop 531 to terminate the call.

Figure 9A:
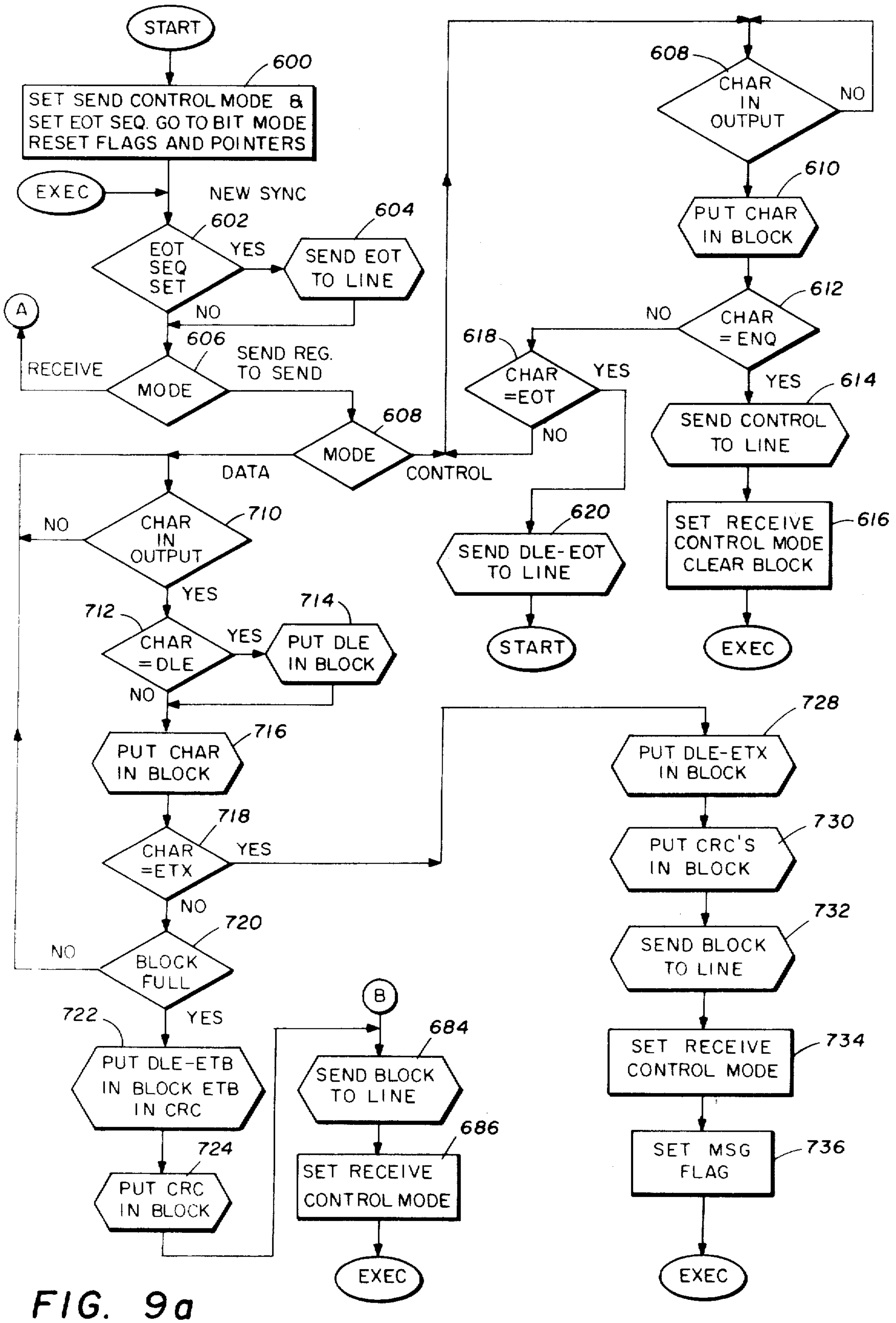
FIGS. 9a-c comprise functional flow diagrams of the operation of the system shown in FIG. 3.
Figure 9B:
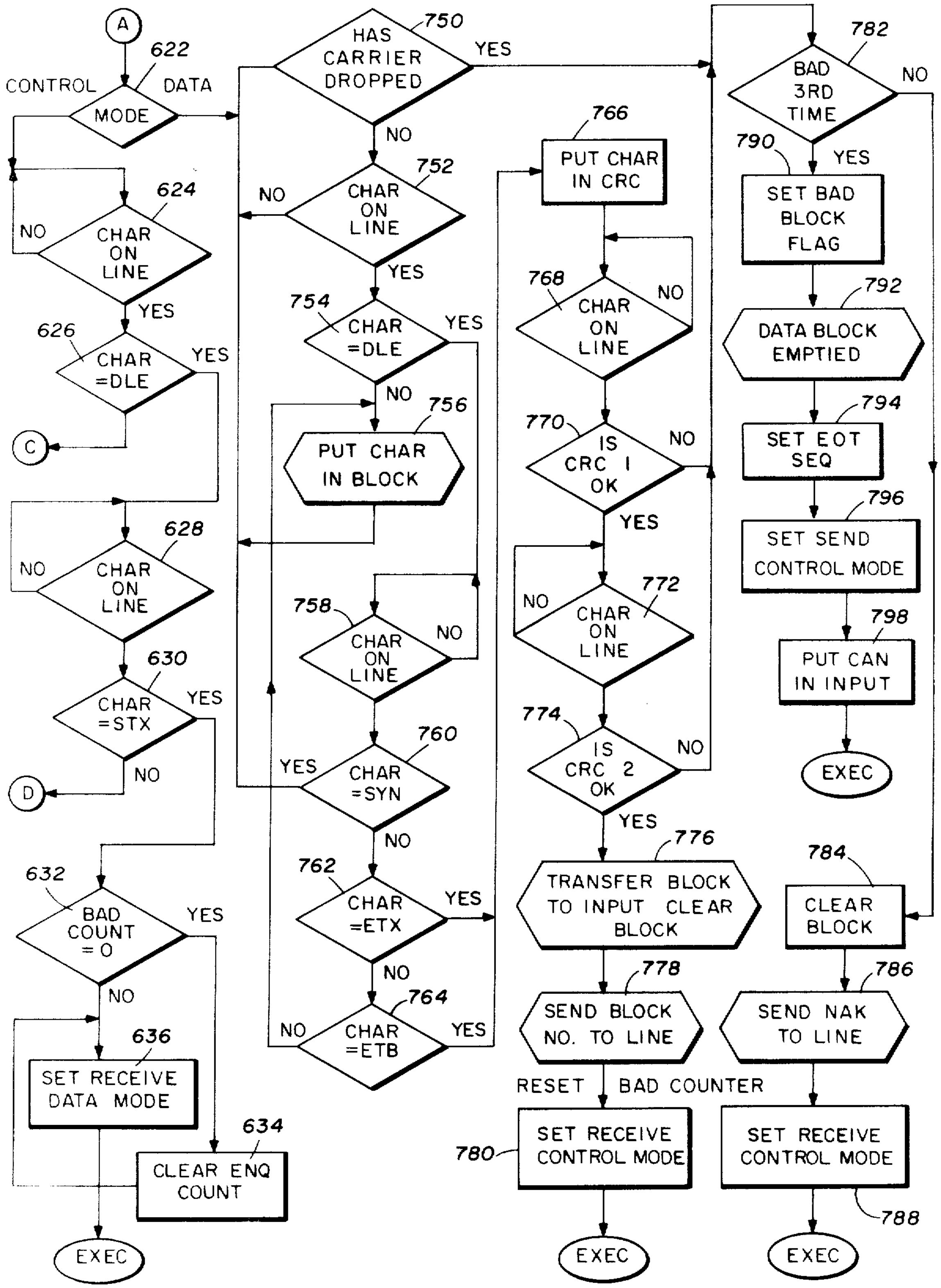
Figure 9C:
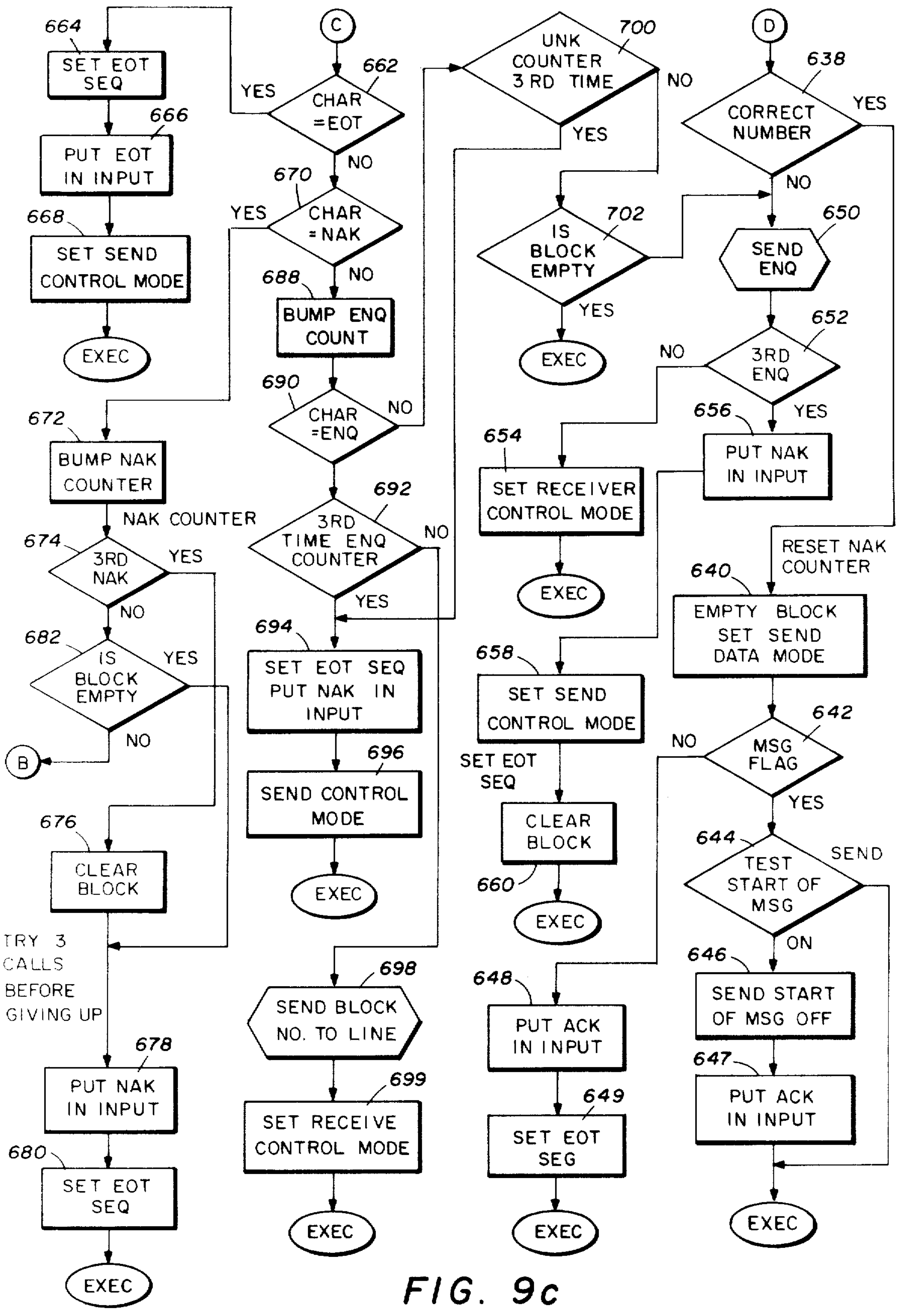

FIGS. 9A–C illustrate the functional operation of the micro CPU 170, in cooperation with the computer 10. To start the operation of the system, a poll must be sent. The micro CPU 170 is thus set in send control mode and the EOT sequence is set at step 600 in order to put the micro CPU in an initial state such that it is looking for a poll. The micro CPU at 600 also resets all flags and registers, including the CRC registers, in the system. An EOT sequence is set at 602 and sent to the line at 604. A decision is made at 606 as to the mode.

If the system is in the send mode, a decision is made at 608 as to whether or not the mode is data or control. In the initial operation of the system, the operation will be the send control mode and the system will wait for a character on the line at 608. When a character is detected at the output at 608, the character is placed in RAM storage to form a control block at 610. At 612, a check is made as to whether or not the character is an enquiry character (ENQ). Upon receipt of an enquiry character, the end of the control block has been received and the control block is sent to the line at 614. If the system is set in the receive control mode at 616 and the character block is clear, then the program continues in execution.

If the character is determined at 612 not to be an ENQ, the character is inspected at 618 as to whether or not it is an EOT. If the character is an EOT, a DLE-EOT is sent to the line at 620 and the particular terminal is caused to hang up the telephone. After sending a poll, the system waits to see what response is received. Thus, the system is set in the receive control mode at 616.

Referring to FIG. 9B, the receive control mode is set at 622 and the system looks for a character on the line from the polled terminal at 624. As soon as the character is received at 624, a check is made at 626 as to whether or not the character is a DLE which signals that a control character is to follow. As will be subsequently described, the terminal in some cases may send other characters such as an EOT which would indicate that the terminal has no traffic to send. The receipt of an EOC will be subsequently described. Also, the terminal may send an NAK which is a negative acknowledgement that the terminal is not ready to receive or the wrong device has been requested or the like. The NAK reception will also be subsequently discussed.

If the character is a DLE, a check is made at 628 for the following character. A check is made at 630 as to whether or not the following character is an STX. If yes, a determination is made at 632 as to whether or not a bad count has been received; if so, the ENQ count is cleared at 634 and the system is set to the receive data mode at 636. If a bad count is not present at 632, the ENQ count is not cleared and the system is set in the receive data mode at 636 and the program is reexecuted.

If the character inspected at 630 is not STX, a decision is made at 638 (FIG. 9C) as to whether or not the character is the correct block number. If the response from the terminal is correct, the data block is emptied at 640 and the system is set to the send data mode. Additionally, the NAK counter is reset. Now that the remote terminal has indicated that it is ready to receive data, an MSG flag is set at 642 to indicate that this was an initial response to the poll. A test is made at 644 as to whether or not the start of MSG is on. If so, the start of message flag is turned off at 646 and an ACK is placed in the input at 647. The ACK indicates to the computer 10 that a good response has been received and the micro CPU 170 is ready to send data and that data is expected. The system is then placed in the send control mode such that the micro CPU initiates detection of a data block to be sent to the remote terminal.

If the MSG flag is not present at 642, an ACK is placed in the input at 648 and an EOT SEQ is sent at 649 to indicate to the computer that a positive response has been received from the terminal and that the terminal is ready to receive a message.

Again referring to FIG. 9C, if a correct number is not sent at 638, it is then desirable to try the terminal again, so another enquiry ENQ is sent at 650. A check is made at 652 as to whether or not three ENQs have been sent. If not, the system is set in the receiver control mode at 654 and the program is reexecuted. If three ENQs have been sent at 352, an NAK is placed in the input at 656, indicating that the terminal did not respond correctly. The system is placed then in the send control mode at 658 and the data block is cleared at 660 due to the fact that it is not possible to send the terminal data.

Again referring to FIG. 9C, a decision is made at 662 as to whether or not the first character sent by the remote terminal is an EOT. If so, the EOT SEQ is set at 664 and an EOT is placed in the input at 666 and the system set in the send control mode at 668. The computer is then notified that the remote terminal does not have any traffic to transmit, and thus the system is placed back in the send control mode so that the system is ready for polling again in the previously identified manner.

If the first character transmitted by the remote terminal is determined not to be an EOT at 662, a check is made at 670 as to whether or not the first character is a NAK. Reception of a NAK can be caused by a number of reasons, such as the instance when the computed CRC character at the remote terminal does not agree with the transmitted CRC character, or in the instance when an incorrect terminal poll has been made. If the first character is a NAK, the NAK counter is bumped at 672 and a decision is made at 674 as to whether or not the character is the third NAK received. If so, the data block is cleared at 676, a NAK is placed in the input to the computer at 678 and the EOT SEQ is set. If the third NAK has not yet been transmitted, a decision is made at 682 as to whether or not the data block is empty. If yes, step 678 is reiterated. If the decision at 682 is no, the block is sent to line at 684 (FIG. 9A) and the system is set to the receive control mode at 686. The system then again waits to detect the response of the remote terminal.

Referring to FIG. 9C, if the first character transmitted by the terminal is determined at 670 not to be an NAK, the ENQ counter is bumped at 688. At this point, if the first character transmitted by the remote terminal is not a DLE, EOT or NAK, the first character should be an ENQ which indicates that the remote terminal did not understand the poll. A decision is made at 690 as to whether or not the first character transmitted was an ENQ; if so, a decision is made at 692 as to whether or not this is the third time that an ENQ has been encountered. If so, the EOT SEQ is set and a NAK is put in the input at 694 to the computer. The system is set in send control mode at 696 and the program is reexecuted. If it was not the third time that ENQ was encountered at 672, the block number is again sent to the line at 698 and the system is set in receive control at 699 in order to receive the next response from the remote terminal.

If it is determined at 690 that the first character transmitted by the remote terminal is not an ENQ, the character is an unknown or UNK and a decision is made at 700 as to whether or not the UNK has been encountered three times. If not, a decision is made at 702 as to whether or not the data block is empty. If the block is empty, the program is reexecuted. If the UNK has been received three times, the program is reiterated at 694.

Referring again to FIG. 9A, after a remote terminal has been polled and has responded correctly with a block number, the system is then switched to the send data mode at 608. At 710, a character is obtained from the output buffer as previously described. In this send data mode, the system is "blind" to everything but a DLE character in order to operate in the transparent mode. At 712, the character is checked for a DLE. If the character is a DLE, another DLE is placed in the data block at 714 in order to annul the DLE, to enable operation in the transparent mode. The character is placed in the data block at 716 and a check is made at 718 as to whether or not the character is an ETX. If not, a check is made at 720 as to whether or not the data block is full.

If the block is not full, the program is reiterated at 710 and additional characters are obtained from the computer output buffer. Additional characters are obtained until the block is full or until an ETX is received. If the block is full, to end the block, a DLE-ETB is placed in the block at 722 and an ETB character is placed in the CRC character. The CRC characters are read from the RAM storage at 724 and are placed in the character block. The block is then sent to line at 684 and the system is set in the receive control mode to await the response of the remote terminal.

If the character at 718 is an ETX, the data block is ended, so a DLE-ETX is placed in the block at 728. The CRC characters are then placed in the block at 730 and the block is sent to line at 732. The system is then set in the receive control mode at 734 to await response of the remote terminal. At 736, the MSG flag is set to indicate that the system is in the process of sending a message.

At this point in operation, the system has thus received a valid response for a pole and a block of data has been transmitted. The system then is switched to the receive data mode at 622 (FIGURE 9B). A check is made at 750 as to whether or not the carrier transferring the data has been dropped.

If the data carrier is satisfactory, a check is made at 752 as to whether or not a character is on the line. If not, the test at 750 is reiterated. If a character is on the line, a test is made at 754 as to whether or not the character is a DLE. If not, the character is placed in the block at 756 and the system waits for the reception of the next character. This loop is continued until the complete message block has been received. The DLE ETX or ETB indicates that the block is complete, so a DLE is looked for at 754. Upon detection of a DLE, the DLE is thrown away according to the transparent mode of operation and the next character is looked for at 758.

At 760, a decision is made as to whether or not the character on the line is an SYN. If so, steps 750 are reiterated. The DLE SYN is transmitted among the data every half second or so to maintain the modem of the system in synchronism. The modem must clock on the edges of the data, so if it is assumed that the accuracy of the synchronous clock is sufficient, it can maintain the system in synchronism for half a second. Thus, if an SYN is received at 760, a character is not placed in a block, but it is thrown away and the next character is placed in the data block.

At 762, a decision is made as to whether or not the character is an ETX and at 764 as to whether or not the character is an ETB. If the character is neither an ETX nor an ETB, the character is ignored and another character is obtained and placed in the message block. If the character was an ETX or ETB, the character is placed in the CRC at 766. The next character on the line is checked at 768. This character should be a CRC character and the character is checked at 770 to determine whether or not the CRC character is accurate. The next character, which also should be a CRC character, is checked at 772 and a determination is made at 774 as to whether or not the second CRC character is accurate.

If the CRC characters are satisfactory, the block is transferred to input at 776 and the data block is cleared. The block is sent to the line at 778 and the system is set to the receive control mode at 780. Also at 780, the bad counter is reset since at this point the system has made a good data transfer. The system, when set in the receive control mode, waits for another response from the remote terminal. The remote terminal may send another block of data or it may send an EOT indicating that the terminal is through with data transmission.

If either of the CRC characters are determined to be invalid, a check is made at 782 as to whether or not the CRC characters have been determined to be bad for the third time. If not, the data block is cleared at 784 and an NAK is sent to line at 786. The system is then set at the receive control mode to await a retransmission of the data from the remote terminal. If the CRC characters are determined to be bad for the third time, a bad block flag is transmitted at 780 and the data block is emptied at 792. An EOT SEQ is set at 794 and the system is set to the send control mode at 796. A CAN is placed in the input at 798 to indicate to the computer that a bad message block has been received. The telephone link may then be hung up, the terminal recalled and the message may be retransmitted for a maximum of three times.

As previously noted, the operational program described in FIGURES 9A-C is programmed into the ROMs 166 and 168 (FIGURE 3) for control of the micro CPU 170. The ROM comprises MOS cells each having gates for controlling the MOS cells. The gates may, for instance, comprise silicon floating in silicon dioxide insulation. Upon the application of a selective voltage, the gate may be selectively charged to control the operation program of the MOS cell in the desired manner. In this manner, the micro CPU and its associated ROMs may be programmed with a binary program to perform the functions previously described.

It will thus be seen that the present invention comprises a unique system for providing binary synchronous communication in connection with a high speed data buss connected to a digital computer programmed to control data transmission between a plurality of data stations. With the use of the present micro central processor unit and its associated circuitry, a plurality of binary synchronous circuit controls according to the invention may be installed without the necessity of substantial reprogramming of the central digital computer and without substantially increasing the workload of the computer. The present system thus provides binary synchronous communications in an efficient and economical manner.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a communications processor system wherein a message switching digital computer is programmed to receive binary coded data from a remote terminal over a data buss and to transmit the coded data via the data buss to a communication station comprising:

modem means for converting received binary coded tone signals into binary coded serial electrical signals, said electrical signals including text characters providing text data and control characters providing synchronization data, message block establishing data and error checking data, means connected with said modem means for converting said serial electrical signals received therefrom into parallel digital signals, a sync character detecting circuit responsive to one of said control characters providing synchronization data for generating a sync indication, lock circuitry responsive to said sync indication for establishing synchronization of said communications station with said parallel digital signals, a processor circuit coupled to the output of said converting means and including a LSI semiconductor device responsive to predetermined ones of said control characters providing message block establishing data for arranging said text data into message blocks having a predetermined number of text characters, a plurality of random access memories connected to said processor circuit for storing said message blocks while excluding said control characters, input buffer means connected between said memories and said data buss for receiving said message blocks under the control of said computer.

2. The combination of claim 1 and further comprising:

cyclic redundancy check circuitry for computing an error check character for said stored message blocks and for comparing the computed error check character with the transmitted error checking character contained in said electrical signals.

3. The combination of claim 2 wherein said cyclic redundance check circuit comprises:

means for determining the numeric binary value of a block of text data, dividing means for dividing the numeric binary value of a block of text data by a constant, means for discarding the quotient generated by said dividing means, and means for transmitting the remainder generated by said dividing means as said error check code.

4. The combination of claim 2 including means for transmitting said electrical binary coded signals in the transparent-text mode with additional characters being capable of utilization as data without taking on control meaning, said central processor unit including means for detecting said additional characters when preceded by a predetermined character for initiation of a control function.

5. The combination of claim 2 wherein said processor circuit comprises:

means connected with said check circuitry for multiplexing said parallel digital signals with any output from said check circuitry resulting from said comparison therein, and means for directing the output of said multiplexing means to said memories.

6. The combination of claim 2 and further comprising:

output buffer means connected to said high speed data buss for receiving parallel digital data from said computer, said buffer connected to said memories for storage of predetermined message blocks of said digital data under the control of said computer, said central processor unit operable to add line control and error checking characters to said digital data, and an output shift register connected between said memories and said modem means for transferring said digital data through said communications link to a remote station.

7. In a communication processor system including a message switching digital computer programmed to receive binary coded data from a plurality of communication stations connected to communication lines and to transmit said binary coded data to designated ones of said communication stations, the combination a first converter coupled to one of the communication lines for receiving serial digital data transmitted from one of said communication stations and for converting said received serial digital data into parallel digital data, said parallel digital data including control characters defining message blocks of a predetermined number of characters, a processor circuit responsive to said control characters for forming said parallel digital data into message blocks including said predetermined number of characters while stripping off said control characters from said data, means for storing said message blocks in a plurality of memories connected with said processor circuit, means for transmitting said message blocks to the computer, said processor circuit further including output means for receiving parallel digital data from the output of the computer and including means for adding control characters to said data in order to define the start and end of message blocks having a predetermined number of text characters, a second converter connected to the output of said processor circuit for converting said parallel digital data received from said computer into serial digital data for transmission to one of said communication lines, and means for transmitting said message blocks output from the computer and said added control characters through said second converter to one of said communication stations via said communication line.

8. The combination of claim 7 and further comprising:

error checking means connected within said processor circuit for checking the accuracy of said stored message blocks prior to transmission of said message blocks to said computer.

9. The combination of claim 8 wherein said error checking means comprises a cyclic redundancy check circuit for computing an error check code from said message blocks and including means for comparing the computed error check code with an error check code originally transmitted with said digital data.

10. The combination of claim 7 and further comprising:

means for converting series digital tone data on said communication line into series electrical digital data for conversion by said first converter.

11. The combination of claim 7 wherein said processor circuit comprises:

a central processor unit, a plurality of read only memories connected to said processor unit for storing instructions for said central processor unit, and a plurality of random access memories for storing said message blocks prior to transmission to the computer.

* * * * *

PO-1050
(5/69)

UNITED STATES PATENT OFFICE
CERTIFICATE OF CORRECTION

Patent No. 3,825,905 Dated July 23, 1974

Inventor(s) Chester C. Allen, Jr.

It is certified that error appears in the above-identified patent and that said Letters Patent are hereby corrected as shown below:

Col. 2, line 19, "area" should be --data--.
Col. 3, line 16, "block" should be --clock--;
line 63, "19" should be --18--.
Col. 4, line 31, "and" should be --end--.
Col. 5, line 39, "recess" should be --access--.
Col. 8, line 5, "drive" should be --driver--;
line 39, "Q" should be --$\overline{Q}$--.

Col. 17, line 4, "300c" should be --300d--;
line 6, "recive" should be --receive--.
Col. 18, line 54, "Q" should be --$\overline{Q}$--;
line 57, "Q" should be --$\overline{Q}$--.
Col. 19, line 5, "Q" should be --$\overline{Q}$--;
line 11, "290" should be --390--;
line 51, after "data" insert --input--.
Col. 20, line 1, "Q" should be --$\overline{Q}$--;
line 13, "Q" should be --$\overline{Q}$--.
Col. 21, line 29, "PND" should be --$\overline{PND}$--.
Col. 24, line 42, "pole" should be --poll--.
Col. 25, line 37, "780" should be --790--.
Col. 27, line 31, after "combination" insert --comprising:--.

Signed and sealed this 11th day of March 1975.

(SEAL)
Attest:

RUTH C. MASON
Attesting Officer

C. MARSHALL DANN
Commissioner of Patents
and Trademarks